United States Patent
Hampel et al.

(10) Patent No.: US 11,012,915 B2
(45) Date of Patent: May 18, 2021

(54) BACKPRESSURE SIGNALING FOR WIRELESS COMMUNICATIONS

(71) Applicant: QUALCOMM Incorporated, San Diego, CA (US)

(72) Inventors: Karl Georg Hampel, Hoboken, NJ (US); Junyi Li, Chester, NJ (US); Hong Cheng, Bridgewater, NJ (US); Navid Abedini, Somerset, NJ (US); Muhammad Nazmul Islam, Littleton, MA (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 16/252,006

(22) Filed: Jan. 18, 2019

(65) Prior Publication Data
US 2019/0297555 A1      Sep. 26, 2019

Related U.S. Application Data
(60) Provisional application No. 62/648,251, filed on Mar. 26, 2018.

(51) Int. Cl.
*H04W 40/22* (2009.01)
*H04W 40/02* (2009.01)
(Continued)

(52) U.S. Cl.
CPC ......... *H04W 40/023* (2013.01); *H04L 45/16* (2013.01); *H04L 47/263* (2013.01); *H04L 47/29* (2013.01);
(Continued)

(58) Field of Classification Search
CPC ......... H04L 45/02; H04L 41/12; H04L 45/00; H04L 45/04; H04L 43/12
See application file for complete search history.

(56) References Cited

U.S. PATENT DOCUMENTS

| | | | | |
|---|---|---|---|---|
| 5,675,807 A | * | 10/1997 | Iswandhi | G01R 31/31727 710/260 |
| 2001/0038621 A1 | * | 11/2001 | Bauer | H04L 47/30 370/337 |
| 2002/0091826 A1 | * | 7/2002 | Comeau | G06F 9/546 709/226 |
| 2003/0196076 A1 | * | 10/2003 | Zabarski | H04L 45/302 712/234 |

(Continued)

FOREIGN PATENT DOCUMENTS

| | | |
|---|---|---|
| WO | WO-2011077065 A1 | 6/2011 |
| WO | WO-2011123549 A1 | 10/2011 |

OTHER PUBLICATIONS
International Search Report and Written Opinion—PCT/US2019/017795—ISA/EPO—dated May 7, 2019.

*Primary Examiner* — Hassan A Phillips
*Assistant Examiner* — Prenell P Jones
(74) *Attorney, Agent, or Firm* — Qualcomm Incorporated

(57) ABSTRACT

Methods, systems, and devices for wireless communications are described. In some wireless systems, a base station centralized unit (CU) may communicate with a user equipment (UE) through a multi-hop backhaul architecture. This multi-hop backhaul connection may include a donor base station and any number of relay base stations connected via backhaul links. In some cases, the relay base stations or the UE may experience data congestion in a logical channel-specific buffer. The relay base stations or UE may implement backpressure signaling (e.g., in the medium access control (MAC) layer) to mitigate the congestion. A wireless device operating as a mobile termination (MT) endpoint may transmit a backpressure report message to a wireless device operating as a base station distributed unit (DU) endpoint for the logical channel. The base station DU may adjust a (Continued)

scheduling rate for data unit transmissions over the indicated logical channel based on the backpressure report.

61 Claims, 18 Drawing Sheets

(51) Int. Cl.
H04L 12/801 (2013.01)
H04L 12/911 (2013.01)
H04L 12/761 (2013.01)
H04W 40/28 (2009.01)
H04L 12/869 (2013.01)
H04L 12/825 (2013.01)
H04W 28/02 (2009.01)

(52) U.S. Cl.
CPC ............ *H04L 47/58* (2013.01); *H04L 47/728* (2013.01); *H04W 28/0289* (2013.01); *H04W 40/22* (2013.01); *H04W 40/28* (2013.01)

(56) References Cited

U.S. PATENT DOCUMENTS

| | | | |
|---|---|---|---|
| 2003/0212830 A1* | 11/2003 | Greenblat | H04L 12/4625 709/251 |
| 2006/0187832 A1* | 8/2006 | Yu | H04L 47/10 370/229 |
| 2006/0187923 A1* | 8/2006 | Yu | H04L 45/00 370/389 |
| 2006/0187930 A1* | 8/2006 | Smith | H04L 45/00 370/392 |
| 2007/0258422 A1* | 11/2007 | Herrmann | H04W 28/12 370/338 |
| 2010/0309788 A1* | 12/2010 | Ho | H04W 28/0205 370/236 |
| 2012/0026934 A1 | 2/2012 | Park et al. | |
| 2012/0127863 A1 | 5/2012 | Yi et al. | |
| 2013/0194924 A1* | 8/2013 | Zhang | H04W 28/10 370/232 |
| 2013/0318256 A1* | 11/2013 | Smith | H04L 45/742 709/242 |
| 2016/0242235 A1* | 8/2016 | Vasudevan | H04W 88/08 |

* cited by examiner

BACKPRESSURE SIGNALING FOR WIRELESS COMMUNICATIONS

CROSS REFERENCES

The present Application for Patent claims the benefit of U.S. Provisional Patent Application No. 62/648,251 by Hampel et al., entitled "BACKPRESSURE SIGNALING FOR WIRELESS COMMUNICATIONS," filed Mar. 26, 2018, assigned to the assignee hereof, and expressly incorporated herein.

BACKGROUND

The following relates generally to wireless communications, and more specifically to backpressure signaling for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may support multi-hop backhauling through relay devices in order to extend the range of wireless access for one or more base stations. These relay devices may be efficiently designed with low complexity and may simply forward received traffic along to other devices. However, in some cases, these relay devices may experience data congestion due to receiving large amounts of traffic (e.g., from a base station centralized unit (CU), another base station, or a UE).

SUMMARY

The described techniques relate to improved methods, systems, devices, or apparatuses that support backpressure signaling for wireless communications. Generally, the described techniques provide for backpressure signaling to handle data congestions in a logical channel-specific buffer. For example, in some wireless systems, a base station centralized unit (CU) may communicate with a user equipment (UE) through a multi-hop backhaul architecture. This multi-hop backhaul connection may include a donor base station and any number of relay base stations connected via backhaul links. In some cases, the relay base stations or the UE may experience data congestion in a buffer associated with a specific logical channel (e.g., a radio link control (RLC) channel or RLC-bearer). The wireless device experiencing congestion may implement backpressure signaling (e.g., in the medium access control (MAC) layer) to mitigate the congestion and help reduce the load on the buffer. For example, a wireless device operating as a mobile termination (MT) endpoint or mobile terminal (MT) for the specific logical channel may transmit a backpressure report message to a wireless device operating as a base station distributed unit (DU) endpoint for the logical channel. The base station DU may adjust a scheduling rate for data unit transmissions over the indicated logical channel based on the backpressure report and may transmit data over the logical channel according to the adjusted scheduling rate. If the wireless device operating as the base station DU lowers the scheduling rate, the wireless device operating as the MT may reduce the load on the buffer. In some cases, the base station CU may configure the base station DU and the MT for backpressure signaling.

A method of wireless communications is described. The method may include receiving data units in a logical channel of a wireless link according to a scheduling rate, determining that a backpressure report condition of the logical channel is met, transmitting, on the wireless link, a backpressure report message indicating the logical channel based at least in part on the determining, and receiving additional data units in the logical channel of the wireless link according to an adjusted scheduling rate based at least in part on transmitting the backpressure report message.

An apparatus for wireless communications is described. The apparatus may include means for receiving data units in a logical channel of a wireless link according to a scheduling rate, means for determining that a backpressure report condition of the logical channel is met, means for transmitting, on the wireless link, a backpressure report message indicating the logical channel based at least in part on the determining, and means for receiving additional data units in the logical channel of the wireless link according to an adjusted scheduling rate based at least in part on transmitting the backpressure report message.

Another apparatus for wireless communications is described. The apparatus may include a processor, memory in electronic communication with the processor, and instructions stored in the memory. The instructions may be operable to cause the processor to receive data units in a logical channel of a wireless link according to a scheduling rate, determine that a backpressure report condition of the logical channel is met, transmit, on the wireless link, a backpressure report message indicating the logical channel based at least in part on the determining, and receive additional data units in the logical channel of the wireless link according to an adjusted scheduling rate based at least in part on transmitting the backpressure report message.

A non-transitory computer-readable medium for wireless communications is described. The non-transitory computer-readable medium may include instructions operable to cause a processor to receive data units in a logical channel of a wireless link according to a scheduling rate, determine that a backpressure report condition of the logical channel is met, transmit, on the wireless link, a backpressure report message indicating the logical channel based at least in part on the determining, and receive additional data units in the logical channel of the wireless link according to an adjusted scheduling rate based at least in part on transmitting the backpressure report message.

Some examples of the method, apparatus, and non-transitory computer-readable medium described above may further include processes, features, means, or instructions for caching a data payload of the received data units in a buffer corresponding to the logical channel. In some examples of the method, apparatus, and non-transitory computer-readable medium described above, determining that the backpressure report condition of the logical channel is met involves processes, features, means, or instructions for comparing a buffer load value to a buffer load threshold, a buffer load availability to a buffer load availability threshold, or a combination thereof.

In some examples of the method, apparatus, and non-transitory computer-readable medium described above, the adjusted scheduling rate includes a decreased scheduling rate that is lower than the scheduling rate or an increased scheduling rate that is higher than the scheduling rate. In some examples of the method, apparatus, and non-transitory computer-readable medium described above, receiving the additional data units in the logical channel of the wireless link according to the adjusted scheduling rate involves receiving the additional data units after a temporary halting of data units transmissions.

In some examples of the method, apparatus, and non-transitory computer-readable medium described above, the logical channel corresponds to a logical channel identifier. Some examples of the method, apparatus, and non-transitory computer-readable medium described above may further include processes, features, means, or instructions for configuring the backpressure report message with the logical channel identifier, a logical channel group identifier corresponding to a logical channel group including the logical channel, or a combination thereof, where the backpressure report message indicates the logical channel based at least in part on the logical channel identifier, the logical channel group identifier, or the combination thereof.

In some examples of the method, apparatus, and non-transitory computer-readable medium described above, determining that the backpressure report condition of the logical channel is met involves receiving a backpressure request message indicating the logical channel, where transmitting the backpressure report message may be based at least in part on a request-based condition.

Some examples of the method, apparatus, and non-transitory computer-readable medium described above may further include processes, features, means, or instructions for configuring the backpressure report message with buffer load information. In some examples of the method, apparatus, and non-transitory computer-readable medium described above, the buffer load information includes a backpressure indicator, a backpressure indicator value, a buffer load value, a buffer load availability indicator, or a combination thereof.

Some examples of the method, apparatus, and non-transitory computer-readable medium described above may further include processes, features, means, or instructions for receiving a configuration for the logical channel, where the configuration includes one or more backpressure report conditions, where determining that the backpressure report condition of the buffer is met may be based at least in part on the configuration.

In some examples of the method, apparatus, and non-transitory computer-readable medium described above, the one or more backpressure report conditions include periodic reporting conditions, buffer load-based reporting conditions, request-based reporting conditions, or a combination thereof. In some examples of the method, apparatus, and non-transitory computer-readable medium described above, the one or more backpressure report conditions further include indications of time intervals for periodic reporting, buffer load thresholds for buffer load-based reporting, buffer load availability thresholds for the buffer load-based reporting, averaging windows for the buffer load-based reporting, hysteresis values for the buffer load-based reporting, or a combination thereof.

In some examples of the method, apparatus, and non-transitory computer-readable medium described above, the configuration may be received on a layer three (L3) signaling connection, a radio resource control (RRC) connection, an F1 application protocol (AP) interface, or a combination thereof.

Some examples of the method, apparatus, and non-transitory computer-readable medium described above may further include processes, features, means, or instructions for transmitting a backpressure capabilities message to a base station CU. In some examples of the method, apparatus, and non-transitory computer-readable medium described above, the backpressure capabilities message includes at least one buffer size value. In some examples of the method, apparatus, and non-transitory computer-readable medium described above, the backpressure capabilities message may be transmitted on an L3 signaling connection, an RRC connection, an F1 AP interface, or a combination thereof.

In some examples of the method, apparatus, and non-transitory computer-readable medium described above, the backpressure report message includes a MAC signaling message. In some examples of the method, apparatus, and non-transitory computer-readable medium described above, transmitting the backpressure report message involves transmitting the MAC signaling message in a MAC channel element on a physical uplink shared channel (PUSCH), in an uplink channel indicator on a physical uplink control channel (PUCCH), or in a combination thereof.

In some examples of the method, apparatus, and non-transitory computer-readable medium described above, the data units include downlink MAC service data units (SDUs) and are received on a physical downlink shared channel (PDSCH). In some examples of the method, apparatus, and non-transitory computer-readable medium described above, the logical channel may be an example of an RLC channel, an RLC-bearer, an RLC-bearer chain, or a combination thereof.

Another method of wireless communications is described. The method may include transmitting data units in a logical channel of a wireless link according to a scheduling rate, receiving a backpressure report message indicating the logical channel, and adjusting the scheduling rate for transmitting the data units in the logical channel based at least in part on the backpressure report message.

An apparatus for wireless communications is described. The apparatus may include means for transmitting data units in a logical channel of a wireless link according to a scheduling rate, means for receiving a backpressure report message indicating the logical channel, and means for adjusting the scheduling rate for transmitting the data units in the logical channel based at least in part on the backpressure report message.

Another apparatus for wireless communications is described. The apparatus may include a processor, memory in electronic communication with the processor, and instructions stored in the memory. The instructions may be operable to cause the processor to transmit data units in a logical channel of a wireless link according to a scheduling rate, receive a backpressure report message indicating the logical channel, and adjust the scheduling rate for transmitting the data units in the logical channel based at least in part on the backpressure report message.

A non-transitory computer-readable medium for wireless communications is described. The non-transitory computer-readable medium may include instructions operable to cause a processor to transmit data units in a logical channel of a wireless link according to a scheduling rate, receive a backpressure report message indicating the logical channel, and adjust the scheduling rate for transmitting the data units in the logical channel based at least in part on the backpressure report message.

Some examples of the method, apparatus, and non-transitory computer-readable medium described above may further include processes, features, means, or instructions for transmitting additional data units in the logical channel of the wireless link according to the adjusted scheduling rate.

In some examples of the method, apparatus, and non-transitory computer-readable medium described above, adjusting the scheduling rate involves decreasing the scheduling rate, increasing the scheduling rate, temporarily halting transmission of the data units, or a combination thereof.

In some examples of the method, apparatus, and non-transitory computer-readable medium described above, the logical channel corresponds to a logical channel identifier. In some examples of the method, apparatus, and non-transitory computer-readable medium described above, the backpressure report message includes the logical channel identifier, a logical channel group identifier corresponding to a logical channel group including the logical channel, or a combination thereof. In some examples of the method, apparatus, and non-transitory computer-readable medium described above, the backpressure report message indicates the logical channel using the logical channel identifier, the logical channel group identifier, or the combination thereof.

Some examples of the method, apparatus, and non-transitory computer-readable medium described above may further include processes, features, means, or instructions for transmitting a backpressure request message indicating the logical channel, where the backpressure report message may be received based at least in part on the backpressure request message.

Some examples of the method, apparatus, and non-transitory computer-readable medium described above may further include processes, features, means, or instructions for receiving a configuration for the logical channel, where the configuration includes one or more trigger conditions for transmitting the backpressure request message.

In some examples of the method, apparatus, and non-transitory computer-readable medium described above, the backpressure report message includes buffer load information. In some examples of the method, apparatus, and non-transitory computer-readable medium described above, adjusting the scheduling rate may be based at least in part on the buffer load information. In some examples of the method, apparatus, and non-transitory computer-readable medium described above, the buffer load information includes a backpressure indicator, a backpressure indicator value, a buffer load value, a buffer load availability indicator, or a combination thereof.

Some examples of the method, apparatus, and non-transitory computer-readable medium described above may further include processes, features, means, or instructions for receiving a configuration for the logical channel, where the configuration includes one or more back-off policies for the logical channel. In some examples of the method, apparatus, and non-transitory computer-readable medium described above, the one or more back-off policies include indications of a step size, a ramping slope, or a combination thereof adjusting the scheduling rate. In some examples of the method, apparatus, and non-transitory computer-readable medium described above, the one or more back-off policies include a backpressure condition, a backpressure threshold, a buffer load threshold, a buffer load availability threshold, or a combination thereof, where adjusting the scheduling rate may be based at least in part on the backpressure condition, the backpressure threshold, the buffer load threshold, the buffer load availability threshold, or the combination thereof.

In some examples of the method, apparatus, and non-transitory computer-readable medium described above, the configuration may be received on an L3 signaling connection, an RRC connection, an F1 AP interface, or a combination thereof.

Some examples of the method, apparatus, and non-transitory computer-readable medium described above may further include processes, features, means, or instructions for transmitting a backpressure capabilities message to a base station CU. In some examples of the method, apparatus, and non-transitory computer-readable medium described above, the backpressure capabilities message may be transmitted on an L3 signaling connection, an RRC connection, an F1 AP interface, or a combination thereof.

In some examples of the method, apparatus, and non-transitory computer-readable medium described above, the backpressure report message includes a MAC signaling message. In some examples of the method, apparatus, and non-transitory computer-readable medium described above, receiving the backpressure report message involves receiving the MAC signaling message in a MAC channel element on a PUSCH, in an uplink channel indicator on a PUCCH, or in a combination thereof.

In some examples of the method, apparatus, and non-transitory computer-readable medium described above, the data units include downlink MAC PDUs. In some examples of the method, apparatus, and non-transitory computer-readable medium described above, the logical channel may be an example of an RLC channel, an RLC-bearer, an RLC-bearer chain, or a combination thereof.

Another method of wireless communications is described. The method may include identifying a first wireless device operating as an MT endpoint and a second wireless device operating as a base station DU endpoint for backpressure handling configuration, transmitting, to the first wireless device, a first configuration for a logical channel, the first configuration including one or more backpressure report conditions for the logical channel, and transmitting, to the second wireless device, a second configuration for the logical channel, the second configuration including one or more back-off policies for the logical channel.

An apparatus for wireless communications is described. The apparatus may include means for identifying a first wireless device operating as an MT endpoint and a second wireless device operating as a base station DU endpoint for backpressure handling configuration, means for transmitting, to the first wireless device, a first configuration for a logical channel, the first configuration including one or more backpressure report conditions for the logical channel, and means for transmitting, to the second wireless device, a second configuration for the logical channel, the second configuration including one or more back-off policies for the logical channel.

Another apparatus for wireless communications is described. The apparatus may include a processor, memory in electronic communication with the processor, and instructions stored in the memory. The instructions may be operable to cause the processor to identify a first wireless device operating as an MT endpoint and a second wireless device operating as a base station DU endpoint for backpressure handling configuration, transmit, to the first wireless device, a first configuration for a logical channel, the first configuration including one or more backpressure report conditions for the logical channel, and transmit, to the second wireless device, a second configuration for the logical channel, the second configuration including one or more back-off policies for the logical channel.

A non-transitory computer-readable medium for wireless communications is described. The non-transitory computer-readable medium may include instructions operable to cause a processor to identify a first wireless device operating as an MT endpoint and a second wireless device operating as a base station DU endpoint for backpressure handling configuration, transmit, to the first wireless device, a first configuration for a logical channel, the first configuration including one or more backpressure report conditions for the logical channel, and transmit, to the second wireless device, a second configuration for the logical channel, the second configuration including one or more back-off policies for the logical channel.

In some examples of the method, apparatus, and non-transitory computer-readable medium described above, the logical channel corresponds to a logical channel identifier. Some examples of the method, apparatus, and non-transitory computer-readable medium described above may further include processes, features, means, or instructions for configuring the first configuration with the logical channel identifier, a logical channel group identifier corresponding to a logical channel group including the logical channel, or a combination thereof. Some examples of the method, apparatus, and non-transitory computer-readable medium described above may further include processes, features, means, or instructions for configuring the second configuration with the logical channel identifier, the logical channel group identifier, or the combination thereof.

In some examples of the method, apparatus, and non-transitory computer-readable medium described above, the one or more backpressure report conditions include periodic reporting conditions, buffer load-based reporting conditions, request-based reporting conditions, or a combination thereof. In some examples of the method, apparatus, and non-transitory computer-readable medium described above, the one or more backpressure report conditions further include indications of time intervals for periodic reporting, buffer load thresholds for buffer load-based reporting, buffer load availability thresholds for the buffer load-based reporting, averaging windows for the buffer load-based reporting, hysteresis values for the buffer load-based reporting, or a combination thereof.

In some examples of the method, apparatus, and non-transitory computer-readable medium described above, the one or more back-off policies include indications of a step size, a ramping slope, or a combination thereof adjusting a data unit scheduling rate. In some examples of the method, apparatus, and non-transitory computer-readable medium described above, the one or more back-off policies include a backpressure condition, a backpressure threshold, a buffer load threshold, a buffer load availability threshold, or a combination thereof.

In some examples of the method, apparatus, and non-transitory computer-readable medium described above, the second configuration for the logical channel includes one or more backpressure request conditions.

Some examples of the method, apparatus, and non-transitory computer-readable medium described above may further include processes, features, means, or instructions for receiving, from the first wireless device, a backpressure capabilities message indicating backpressure handling capabilities of the first wireless device. In some examples of the method, apparatus, and non-transitory computer-readable medium described above, the backpressure capabilities message may be received on an L3 signaling connection, an RRC connection, an F1 AP interface, or a combination thereof.

Some examples of the method, apparatus, and non-transitory computer-readable medium described above may further include processes, features, means, or instructions for receiving, from the second wireless device, a backpressure capabilities message indicating backpressure handling capabilities of the second wireless device. In some examples of the method, apparatus, and non-transitory computer-readable medium described above, the backpressure capabilities message may be received on an L3 signaling connection, an RRC connection, an F1 AP interface, or a combination thereof.

In some examples of the method, apparatus, and non-transitory computer-readable medium described above, the first configuration and the second configuration may be transmitted on an L3 signaling connection, an RRC connection, an F1 AP interface, or a combination thereof.

In some examples of the method, apparatus, and non-transitory computer-readable medium described above, the first wireless device is an example of a UE or a relay base station. In some examples of the method, apparatus, and non-transitory computer-readable medium described above, the second wireless device is an example of a relay base station or a donor base station. In some examples of the method, apparatus, and non-transitory computer-readable medium described above, the logical channel may be an example of an RLC channel, an RLC-bearer, an RLC-bearer chain, or a combination thereof.

DETAILED DESCRIPTION

Figure 1:
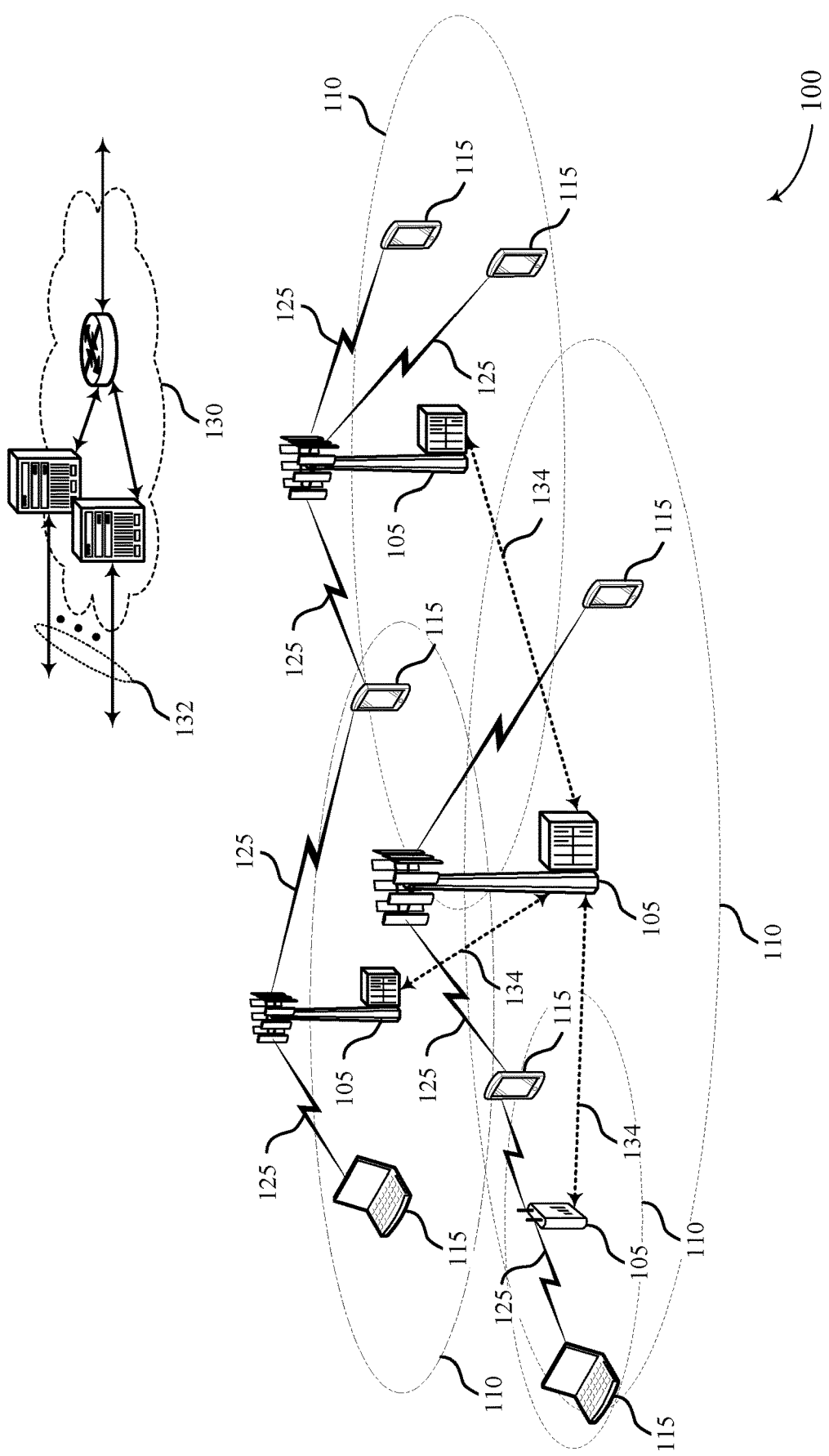
FIGS. 1 and 2 illustrate examples of wireless communications systems that support backpressure signaling for wireless communications in accordance with aspects of the present disclosure.

In some wireless communications systems (e.g., New Radio (NR) systems), base stations may be split into base station centralized units (CUs) and base station distributed units (DUs). The base station CUs may be a component of a database, data center, core network, or network cloud. A base station CU may communicate with a donor base station via a backhaul link (e.g., a wireline backhaul or wireless backhaul). This donor base station may operate as a base station DU for a multi-hop backhaul communication network. For example, the multi-hop backhaul communication network may include a chain of wireless devices (e.g., starting with the donor base station and ending with a user equipment (UE), with any number of relay devices in between) communicating over backhaul links in order to extend the range of the base station CU. In some cases, a wireless device in the multi-hop chain may experience data congestion. For example, a relay base station may receive data units over a logical channel at a higher data rate than the relay base station can forward the data units. In some cases, the congestion may be due to a low complexity or cost of the relay device or a mismatch in data rate capabilities between the relay device and other devices in the backhaul chain. This may result in overloading the data buffer corresponding to a particular logical channel that the data units are received on by the relay base station.

To mitigate this data congestion, the relay base station—or any wireless device in the multi-hop backhaul chain experiencing congestion in a data buffer—may implement backpressure signaling in the wireless communications system. For example, the relay base station may determine to transmit a backpressure report message to the wireless device that is transmitting the data units on the logical channel corresponding to the overloaded buffer. The relay base station may transmit this backpressure report (e.g., using medium access control (MAC) signaling) based on a periodic reporting condition, a buffer load condition, a backpressure request condition, or some combination of these conditions. The backpressure report message may include buffer load information for the overloaded buffer, an indication of the logical channel corresponding to the overloaded buffer, or a combination thereof. The wireless device receiving the backpressure report message may adjust (e.g., reduce or increase) the scheduling rate for data unit transmissions on the indicated logical channel based on the backpressure report message. In some cases, reducing the data rate on the logical channel may allow the relay base station to process or forward the data units faster than they are received, reducing the load on the buffer. In some cases, the relay base station may preemptively transmit this backpressure report message prior to buffer overloading (e.g., based on buffer load or buffer availability threshold values). In some cases, the base station CU may configure the wireless devices in the multi-hop backhaul network in order to implement this backpressure signaling (e.g., based on capabilities of the wireless devices).

Aspects of the disclosure are initially described in the context of wireless communications systems and wireless networks (e.g., wireless backhaul networks). Aspects of the disclosure are further illustrated by and described with reference to process flows, apparatus diagrams, system diagrams, and flowcharts that relate to backpressure signaling for wireless communications.

FIG. 1 illustrates an example of a wireless communications system 100 that supports backpressure signaling for wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2, Xn, F1, or other interface) either directly (e.g., directly between base stations 105) or indirectly (e.g., via core network 130).

The core network 130 may provide user authentication, access authorization, tracking, Internet Protocol (IP) or Ethernet connectivity, and other access, routing, or mobility functions. The core network 130 may be an evolved packet core (EPC) or a Next Generation Core (NGC), which may include at least one mobility management entity (MME), authentication and mobility management function (AMF), or session management function (SM), at least one serving gateway (S-GW), and at least one Packet Data Network (PDN) gateway (P-GW) or userplane function (UPF). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW or UPF may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as $T_f$=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems 100, base stations 105 may be split into base station CUs and base station DUs. The base station CUs may be a component of a database, data center, or the core network 130. A base station CU may communicate with a donor base station 105 via a backhaul link 132 (e.g., a wireline backhaul or a wireless backhaul). This donor base station 105 may operate as a base station DU for a multi-hop backhaul communication network. For example, the multi-hop backhaul communication network may include a chain of wireless devices (e.g., starting with the donor base station 105 and ending with a UE 115, with any number of relay base station 105 in between) communicating over backhaul links 134 in order to extend the range of the base station CU. In some cases, a wireless device in the multi-hop chain may experience data congestion. For example, a relay base station 105 may receive data units over a logical channel at a higher data rate than the relay base station 105 can forward the data units to another logical channel. This may result in overloading the buffer for the logical channel that the relay base station 105 is receiving the data units on.

To mitigate this data congestion, the relay base station 105—or any wireless device in the multi-hop backhaul chain experiencing congestion in a data buffer—may implement backpressure signaling in the wireless communications system 100. For example, the relay base station 105 may determine to transmit a backpressure report message to the wireless device transmitting the data units on the logical channel corresponding to the overloaded buffer. The relay base station 105 may transmit this backpressure report based on a periodic reporting condition, a buffer load condition, a backpressure request condition, or some combination of these conditions. The backpressure report message may include buffer load information for the overloaded buffer, an indication of the logical channel corresponding to the overloaded buffer, or a combination thereof. The wireless device receiving the backpressure report message may adjust (e.g., reduce) the scheduling rate for data unit transmissions on the indicated logical channel. In some cases, reducing the data rate on the logical channel may allow the relay base station 105 to process or forward the data units faster than they are received, reducing the load on the buffer. In some cases, the relay base station 105 may preemptively transmit this backpressure report message prior to buffer overloading (e.g., based on buffer load or buffer availability threshold values). In some cases, the base station CU may configure the wireless devices in the multi-hop backhaul network for backpressure signaling (e.g., based on capabilities of the wireless devices).

Figure 2:
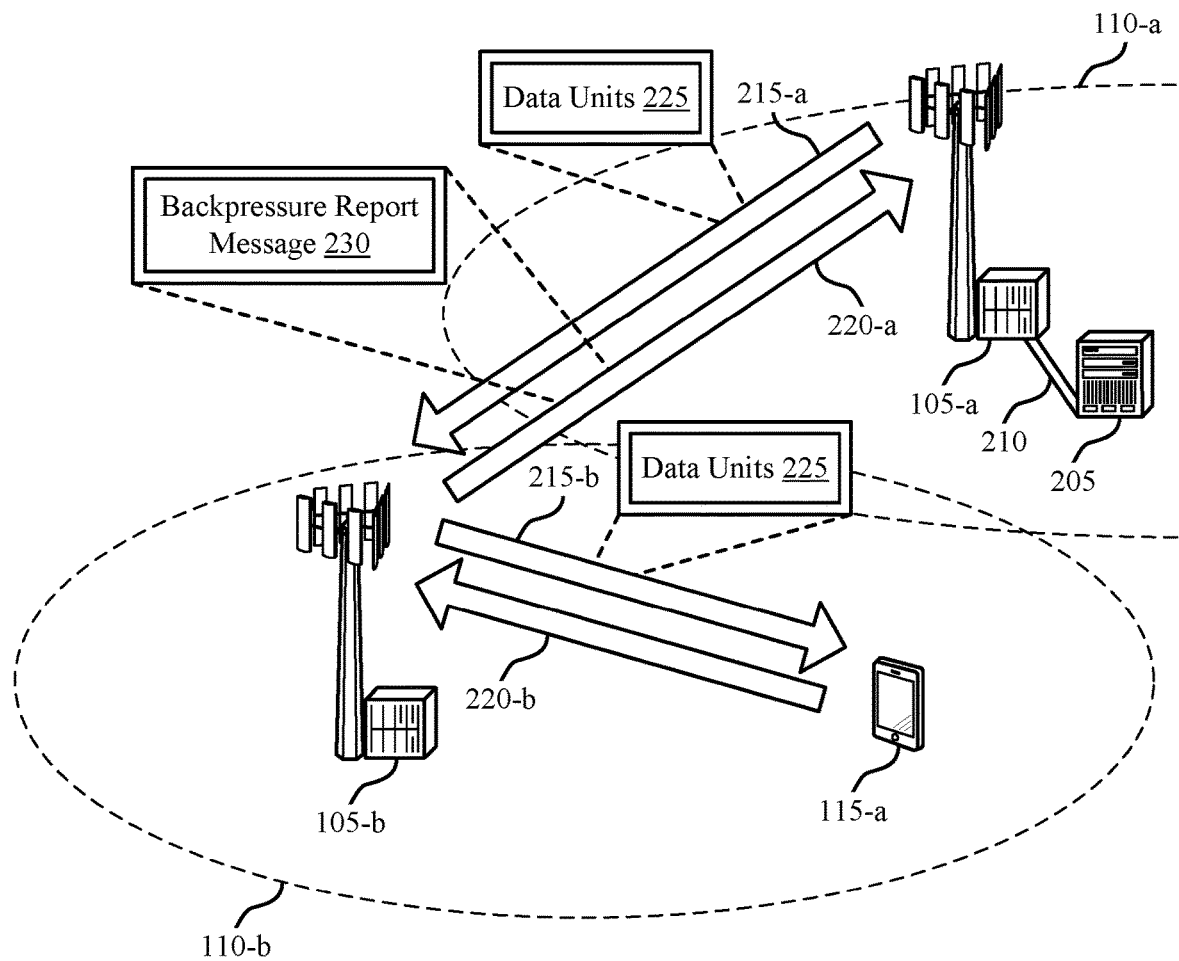

FIG. 2 illustrates an example of a wireless communications system 200 that supports backpressure signaling for wireless communications in accordance with aspects of the present disclosure. The wireless communications system 200 (e.g., an NR system, an LTE system, etc.) may include UE 115-a, which may be an example of a UE 115 as described with reference to FIG. 1. Additionally, the wireless communications system 200 may include a donor base station 105-a and a relay base station 105-b, which may be examples of base stations 105 described with reference to FIG. 1. These base stations 105 may provide network coverage for geographic areas 110-a and 110-b, respectively. The donor base station 105-a may be connected to a base station CU 205 via a wireline backhaul 210, and may transmit data units 225 to relay base station 105-b on a downlink channel 215-a. The relay base station 105-b may transmit data units 225 to UE 115-a on the downlink channel 215-b. The donor base station 105-a or the relay base station 105-b may adjust the scheduling of these data unit 225 transmissions based on backpressure report messages 230 received on the uplink channel 220 (e.g., from UE 115-a on uplink channel 220-b or from relay base station 105-b on uplink channel 220-a). As described, the relay base station 105-b may act as a relay between the donor base station 105-a and UE 115-a in both transmission directions. The donor base station 105-a may refer to the base station containing a base station DU connected to the base station CU 205.

Some wireless communications systems 200 may implement wireless multi-hop backhauling, for example, using integrated-access and backhaul (IAB) networks. Multi-hop backhauling may support base station range extensions for wireless access, such that donor base station 105-a may serve UE 115-a outside geographic area 110-a (e.g., via relay base station 105-b). In these cases, relay base station 105-b may be designed with low complexity (e.g., as compared to base station 105-a or a base station CU 205), which may decrease the cost and maintenance associated with deploying such multi-hop backhaul networks. However, in some cases, the relay base station 105-b may experience congestion due to an amount of traffic through the relay. This congestion may be due to the inability of the base station 105-b to indicate to base station 105-a a data rate forwarding capability, a buffer status, or the like, which may be due to the relatively low complexity of the base station 105-b. To handle this congestion, the wireless communications system 200 may support backpressure signaling to indicate data congestion.

As described below, backpressure signaling may be implemented to throttle downlink traffic (e.g., from the base station CU 205 to UE 115-a via the donor base station 105-a and the relay base station 105-b). However, it is to be understood that backpressure techniques similar to those described below may be implemented to handle congestion for other forms of wireless traffic. For example, backpressure signaling may be implemented to throttle uplink traffic, D2D traffic, etc. Additionally, the wireless communications system 200 may include any number of relay base stations 105 for relaying access traffic between the donor base station 105-a and the UE 115-a. Any of these wireless devices in the multi-hop backhaul chain (e.g., the relay chain from the donor base station 105-a to the UE 115-a) may experience data congestion and may implement backpressure signaling techniques to mitigate the data congestion.

In the downlink case, donor base station 105-a may transmit a large amount of data units 225 to relay base station 105-b (e.g., over a backhaul link, such as downlink channel 215-a) to relay to UE 115-a (e.g., over downlink channel 215-b). The donor base station 105-a may receive this downlink data from the base station CU 205 (e.g., over a wireline link 210 or a wireless link) and may transmit this data as protocol data units 225 (PDUs), and relay base station 105-b may receive this data as service data units 225 (SDUs). In some cases, donor base station 105-a may support a higher rate of downlink data transmission on a logical channel in the multi-hop backhaul chain than relay base station 105-b. For example, the multi-hop backhaul chain may include two hops: the logical channel between donor base station 105-a and relay base station 105-b, and the logical channel between relay base station 105-b and UE 115-a. Data units 225 may be transmitted on the first logical channel at a higher scheduling rate (e.g., 2 gigabytes (GB) per second) than on the second logical channel (e.g., 1 GB per second). In these cases, the buffer storing the data units 225 at relay base station 105-b may become overloaded due to the rate of receiving data being greater than the rate of transmitting data.

To handle this buffer overloading, the wireless communications system 200 may implement uplink backpressure signaling (e.g., on the MAC layer). This backpressure signaling may be applied for specific logical channels, as the wireless devices may experience different levels of traffic over different logical channels. In other cases, backpressure signaling may be applied in an aggregated manner for multiple logical channels (e.g., a logical channel group).

To perform backpressure signaling, a wireless device experiencing congestion may transmit a backpressure report message 230 on an uplink channel 220. The wireless device may transmit the backpressure report message 230 on the MAC layer, for example, via a physical uplink control channel (PUCCH) using an uplink channel indicator, via a physical uplink shared channel (PUSCH) using a MAC channel element, or via some similar process. The wireless device may configure the backpressure report message 230 to include buffer load information, logical channel information, or a combination thereof. For example, the buffer load information may include a buffer overload indicator (e.g., a binary value indicating either that the buffer is overloaded or that the buffer is not overloaded), a buffer load indicator value from a discrete range of values (e.g., from 0 to 7, where each buffer load indicator value may correspond to a different back-off policy), an explicit buffer load value (e.g., in bytes), a buffer availability value (e.g., using an indicator value or an explicit value), or some combination of this buffer load information. The logical channel information may include a logical channel indicator or identifier or may include a logical channel group indicator or identifier (e.g., where the logical channel experiencing congestion is included in or can otherwise be determined from the logical channel group).

The wireless device may transmit the backpressure report message 230 periodically (e.g., according to a pre-determined, semi-static, or dynamic time interval), when a buffer load value for the logical channel exceeds or falls below one or more threshold values, when the wireless device receives a backpressure request message, or based on some combination of these conditions. In the case of a backpressure request message, the wireless device (e.g., relay base station 105-b) may receive a backpressure request message on the downlink channel 215 (e.g., from donor base station 105-a) via a physical downlink control channel (PDCCH) using a downlink channel indicator, via a physical downlink shared channel (PDSCH) using a MAC channel element, or via some similar process. The backpressure request message may include a backpressure request indicator, a logical channel indicator (e.g., for a logical channel or a logical channel group), one or more report conditions or modified report conditions, or some combination of these parameters. The wireless device receiving the backpressure request message may transmit a backpressure report message 230 for the indicated logical channel and/or may update backpressure reporting conditions based on the indicated report conditions.

If a wireless device (e.g., donor base station 105-*a*) receives a backpressure report message 230, the wireless device may adjust a data transmission rate according to the backpressure report message 230. For example, the backpressure report message 230 may indicate the logical channel 235-*a* carrying data units 225 and may indicate for donor base station 105-*a* to reduce the scheduling rate for the downlink data unit 225 transmissions (e.g., due to congestion at the logical channel-specific buffer for relay base station 105-*b*). Accordingly, donor base station 105-*a* may reduce the data scheduling rate for the indicated logical channel or logical channel group by a pre-determined amount, to a pre-determined amount, for a pre-determined length of time, or some combination of these or other related data scheduling rate adjustments. In some cases, donor base station 105-*a* may be configured with scheduling rates corresponding to different buffer load values for relay base station 105-*b* and may select a scheduling rate based on the indicated buffer information within the backpressure report message 230. This may involve decreasing the scheduling rate or increasing the scheduling rate depending on the buffer load information. In some cases, donor base station 105-*a* may refrain from transmitting on the logical channel for a pre-determined or dynamic length of time based on the backpressure report message 230. Any of these scheduling rate changes may efficiently manage the buffer load at relay base station 105-*b* for the indicated logical channel.

The devices in wireless communications system 200 may be configured for backpressure signaling by the base station CU 205. For example, the base station CU 205 may utilize wired or wireless signaling (e.g., layer 3 (L3) signaling) to configure the devices. In some cases, the configurations may be based on the capabilities of the devices. For example, UE 115-*a*, relay base station 105-*b*, and donor base station 105-*a* may transmit capabilities messages (e.g., L3 messages) to the base station CU 205, and the base station CU 205 may configure the devices accordingly.

The capabilities and configurations may be specific to mobile termination (MT) operations or base station DU operations. For example, for each logical channel, the downlink device may perform MT operations (e.g., acting in a UE operating mode or mobile terminal (MT) operating mode, performing UE functionality (UEF), etc.), and the uplink device may perform base station DU operations (e.g., acting in a base station operating mode, performing access node functionality (ANF), etc.). As illustrated, UE 115-*a* may operate as an MT endpoint of a logical channel, and relay base station 105-*b* may operate as a base station DU for this logical channel. Additionally, relay base station 105-*b* may operate as the MT endpoint for a different logical channel, where donor base station 105-*a* may operate as the base station DU for this different logical channel. The base station DU at donor base station 105-*a* may communicate with the base station CU 205 (e.g., over the wireline backhaul 210). As such, UE 115-*a* and relay base station 105-*b* may be configured for MT operations, while relay base station 105-*b* and donor base station 105-*a* may be configured for base station DU operations by the base station CU 205.

In some cases, the wireless devices operating as MT endpoints may transmit capabilities reports or capabilities messages to the base station CU 205 indicating support for backpressure signaling. The base station CU 205 may transmit a configuration message to the wireless devices operating as MT endpoints including configurations for backpressure report signaling. These configurations may apply to all links, a specific link, all logical channels, a specific logical channel, or a specific logical channel group. The configuration message may include backpressure reporting conditions, which specify when a device operating as an MT endpoint is triggered to transmit a backpressure report message 230. These backpressure reporting conditions may include periodic reporting conditions (e.g., such as a time interval for periodic report transmissions), load-based reporting conditions (e.g., such as buffer load conditions for report transmissions), request-based reporting conditions, or a combination thereof. The buffer load conditions may include specific load thresholds, load levels, hysteresis values, temporal averaging windows, or some combination of these conditions. In some cases, the configuration message may include a mapping table between buffer load indicator values and actual buffer load values. For example, if the wireless device indicates a buffer size to the base station CU 205 (e.g., in the capabilities report), the base station CU 205 may determine a corresponding mapping table based on the buffer size.

In some cases, the wireless devices operating as base station DU endpoints may transmit capabilities reports or capabilities messages to the base station CU 205 indicating support for backpressure signaling. The base station CU 205 may transmit a configuration message to the wireless devices operating as MT endpoints, including configurations for backpressure request signaling, backpressure report handling, or both. For example, the configuration message may include backpressure request signaling conditions, which may apply to all links, a specific link, all logical channels, a specific logical channel, or a specific logical channel group. The backpressure request signaling conditions may include periodic conditions or signaling rate conditions for transmitting a backpressure request message to an MT endpoint (e.g., to trigger a backpressure report message 230 transmission in response). The backpressure report handling may include back-off policies to perform in response to receiving backpressure report messages 230. In some cases, back-off policies may refer to policies for decreasing or increasing data unit 225 scheduling rates for specific logical channels.

The back-off policies may include adjusting an average data throughput for an indicated link, logical channel, or logical channel group. In some cases, the adjustment amount or the length of time for the adjustment to remain in place may depend on buffer information indicated in the received backpressure report message 230. Additionally or alternatively, the back-off policies may include a rate of ramping up or ramping down the throughput for the designated link, logical channel, or logical channel group, where the rate may depend on the buffer load information. In some cases, the back-off policies may include support for complex behaviors, such as stepping down data throughput before subsequently ramping up the data throughput at some constant or variable rate.

All of these capabilities and configuration messages may be examples of RRC signaling, F1 application protocol (AP)

communications, or some combination thereof. As described above, the base stations 105 may be examples of full gNBs, access nodes, eNBs, or some combination thereof, while the base station CU 205 may be an example of a gNB-CU, a gNB, or a control function.

Figure 3:
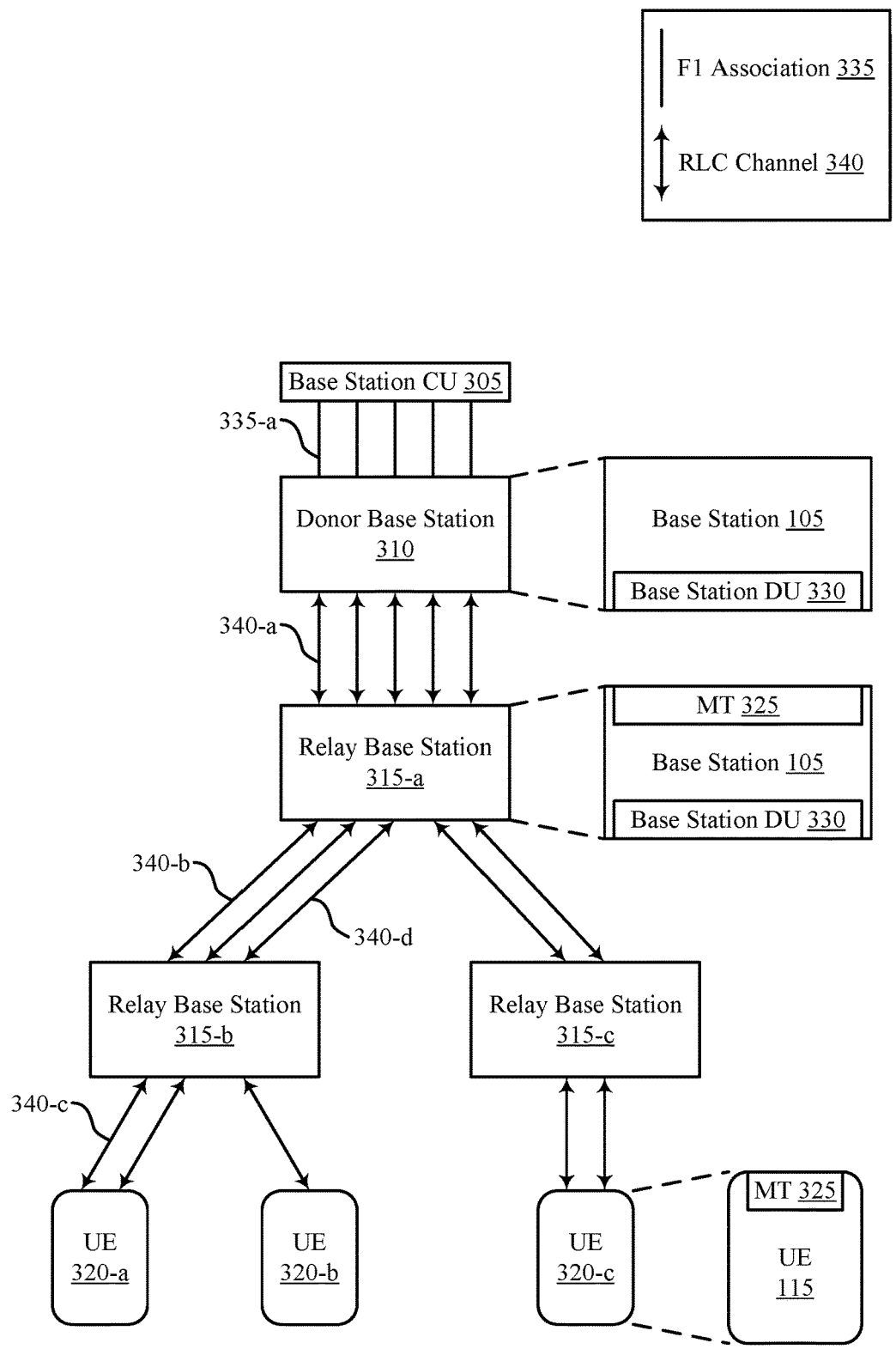
FIG. 3 illustrates an example of a wireless backhaul network that supports backpressure signaling for wireless communications in accordance with aspects of the present disclosure.

FIG. 3 illustrates an example of a wireless backhaul network 300 that supports backpressure signaling for wireless communications in accordance with aspects of the present disclosure. The wireless backhaul network 300 may be an example of the wireless communications system 100 or 200 described with respect to FIGS. 1 and 2. The wireless backhaul network 300 may include a donor base station 310, relay base stations 315, and UEs 320, which may be examples of the corresponding devices described with reference to FIGS. 1 and 2. The donor base station 310 may be connected to a base station CU 305 with wired links (e.g., a wireline backhaul), while the donor base station 310, relay base stations 315, and UEs 320 may be connected via wireless links. These wireline links may support F1 associations 335 between a base station DU 330 and a base station CU 305, while the wireless links may support RLC channels 340 between an MT endpoint 325 and a base station DU 330 endpoint.

The wireless backhaul network 300 may include a number of relay base stations 315, donor base stations 310, and a base station CU 305. The system architecture may implement a CU/DU-split architecture, where each relay base station 315 and donor base station 310 contains a base station DU 330, and the base station CU 305 resides in a data center and/or operates in a network cloud. As most of the base station processing is performed at the base station CU 305, the relay base stations 315 may be efficiently designed with a low complexity and cost (e.g., as compared to the base station CU 305), as these base stations 105 are used to forward data between the donor base station 310 and the UEs 320. The base station DUs 330 may be associated with a base station CU 305 based on F1 associations 335. These F1 associations 335 may carry access data between a base station CU 305 and a base station DU 330. These F1 associations 335 may be supported by wireline links or, in some cases, with wireless links.

To get the access data from the base station DUs 330 to a UE 320, the wireless backhaul network 300 may implement RLC channels 340. Each RLC channel 340 may be an example of an access channel, and may include an upstream base station DU 330 endpoint and a downstream MT endpoint 325. For example, a UE 115 may connect with a base station 105 using an RLC channel 330, where the UE 115 performs MT functionality and the base station 105 performs base station DU functionality. In some cases, this base station DU 330 may directly communicate with the base station CU 305 using an F1 association 335. In other cases, the base station DU 330 may be a component of a relay base station 315 and may perform one or more hops to other base stations 105 before reaching a base station DU 330 that communicates with the base station CU 305. These hops may be performed with access channels similar to those formed between the UEs 115 and base stations 105. For example, a downstream base station 105 may perform MT operations (e.g., similar to a UE 115), while an upstream base station 105 may perform base station DU operations. In this way, base stations 105 may also form RLC channels 340 to relay access data from one base station 105 to another. In this way, access data may be forwarded between the base station CU 305 and a UE 320 via a donor base station 310 (i.e., the node in the system that interfaces between the wireless network and the wireline network) and any number of relay base stations 315 through a chain of RLC channels 340.

In this way, a UE radio bearer may be split into F1 association 335 components and RLC channel 340 components (e.g., RLC-bearer components). A UE 320 and base station CU 305 may maintain the F1 association 335 across the relay base stations 315 using these chains of RLC channels 340, which may alternatively be referred to as RLC-bearers. For example, the backhaul links between the different base stations 105 may support the RLC channel 340 hopping. In some cases, each backhaul link may be UE-specific. For example, each backhaul link may support an RLC channel or RLC chain from the base station CU 305 to a single UE 320. In one specific example, F1 association 335-a is supported by the chain of RLC channels 340-a, 340-b, and 340-c. In this way, the RLC channel 340-c between UE 320-a and relay base station 315-b is extended all the way to the donor base station 310. This RLC-bearer chain (i.e., this chain of RLC-bearers, where, in this case, the RLC-bearers correspond to the RLC channels 340-a, 340-b, and 340-c) may support UE 320-a, while separate RLC-bearer chains may support UEs 320-b and 320-c. In some cases, the RLC-bearer chains for different UEs 320 may hop through different sets of relay base stations 315 (e.g., based on the geographic locations of the UEs 320). Additionally, the base station CU 305 may support multiple RLC-bearer chains for a single UE 320 for redundancy or improved data throughput. As illustrated, the base station CU 305 may support UE 320-a with two RLC-bearer chains and UE 320-b with one RLC-bearer chain through donor base station 310, relay base station 315-a, and relay base station 315-b. Similarly, the base station CU 305 may support UE 320-c with an additional two RLC-bearer chains through donor base station 310, relay base station 315-a, and relay base station 315-c.

This wireless backhauling (e.g., IAB) between different base stations 105 utilizing RLC channels 340 may extend the range of a wireline backhaul or fronthaul. As illustrated, the wireless backhaul network 300 may support multiple backhaul hops across multiple relay base stations 315, as well as redundant connectivity between base stations 105 using multiple paths between the nodes of the system. The base stations 105 may transmit data across the multi-hop backhaul network utilizing a routing mechanism, which may operate on layer 2 (L2). In some cases, the routing mechanism or a transmitter on each backhaul link may support a separate queue for each RLC channel 340. As these RLC channels 340 may be UE-specific, maintaining separate queues may correspond to separate data queues for each UE 320. Utilizing UE-specific data queues and a scheduler (e.g., a MAC scheduler) on each backhaul link that can support UE-specific quality of service (QoS), the wireless backhaul network 300 may provide access to a large number of UEs 320. Each relay base station 315 may perform UE-specific forwarding through the mapping of the corresponding RLC-channels according to channel-specific schedulers, such that access traffic for UE 320-a may be forwarded through RLC channel 340-b according to a first scheduling rate, while access traffic through RLC channel 340-d may correspond to a different UE 320 (e.g., UE 320-b) and may be transmitted according to a different scheduling rate. These separate data queues and schedulers may allow fine-grain QoS support on the backhaul links, allowing the base stations 105 to handle the limited backhaul capacity and hop-count dependent latency associated with the wireless backhaul links.

Each of these RLC channels 340 may be referred to as logical channels, RLC-bearers, or both. The base station DUs 330 at the donor base station 310 and each of the relay base stations 315 may support multiple logical channels for backhaul data transmission (e.g., to provide access to multiple UEs 320 in the wireless system, or to provide multiple access channels for a single UE 320). The wireless backhaul network 300 may support logical channel-specific backpressure signaling on these RLC channels 340 to mitigate congestion at a base station 105 (e.g., a relay base station 315 or a donor base station 310) or a UE 115 (e.g., a UE 320). For example, relay base station 315-b may send a backpressure report message (e.g., utilizing MT operations) indicating RLC channel 340-b to relay base station 315-a. The base station DU 330 at relay base station 315-a may adjust the scheduling of downlink traffic on RLC channel 340-b (e.g., using the RLC channel-specific schedulers as described herein) based on receiving the backpressure report message from relay base station 315-b. In this way, the wireless backhaul network 300 may mitigate congestion at relay base station 315-b due to RLC channel 340-b. However, in some cases, RLC channel 340-d may not be experiencing heavy traffic or congestion. By utilizing logical channel-specific backpressure signaling, relay base station 315-a may reduce the traffic on RLC channel 340-b without affecting the traffic on other RLC channels 340 (e.g., including RLC channel 340-d), efficiently handling logical channel-specific data congestion.

Figure 4:
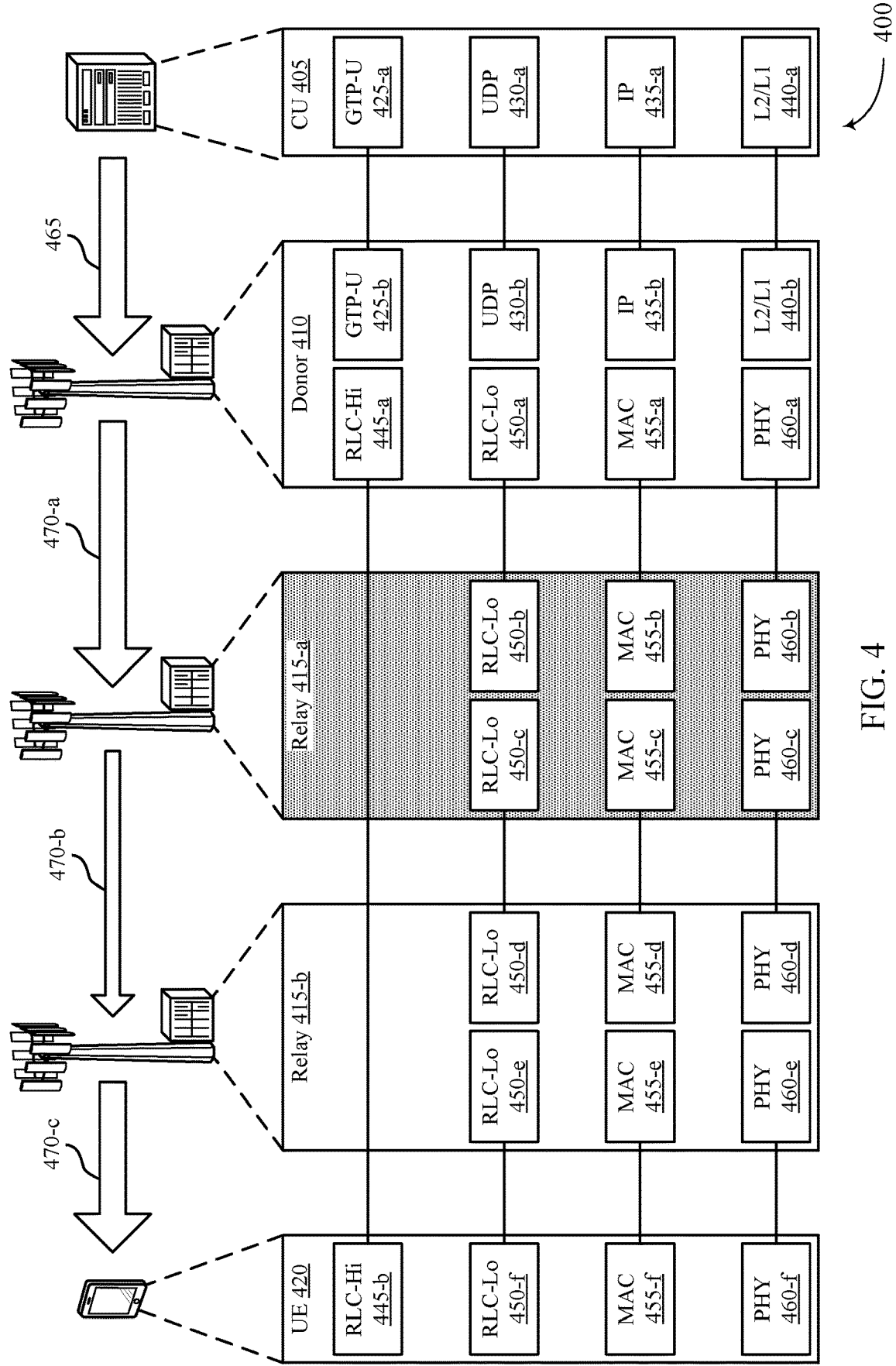
FIG. 4 illustrates an example of a wireless network, including protocol stacks and layer-specific signaling, that supports backpressure signaling for wireless communications in accordance with aspects of the present disclosure.

FIG. 4 illustrates an example of a wireless network 400, including protocol stacks and layer-specific signaling, that supports backpressure signaling for wireless communications in accordance with aspects of the present disclosure. The wireless network 400 may be an example of a wireless communications system 100 or 200 or a wireless backhaul network 300 as described with reference to FIGS. 1 through 3. The wireless network 400 may include a CU 405, a donor base station 410, any number of relay base stations 415, and a UE 420, which may be examples of the devices described with reference to FIGS. 1 through 3. The CU 405 may transmit data to the donor base station 410 on link 465, which may be an example of a wired or wireless link. The donor base station 410 may transmit data (e.g., data units) on the downlink to relay base station 415-a on logical channel 470-a, which may be an example of an RLC channel, RLC-bearer, or combination of the two. This data may be relayed to relay base station 415-b on logical channel 470-b and to UE 420 on logical channel 470-c. In some cases, the system may include a fewer or greater number of relay base stations 415 in the logical channel chain (e.g., the RLC-bearer chain). While the processes below are described in the downlink direction, in some cases, similar processes may be performed for uplink transmissions.

The wireless devices may communicate on one or more different layers. For example, as illustrated, the CU 405 and donor base station 410 may communicate on the general packet radio service (GPRS) tunneling protocol user part (GTP-U) layer using GTP-U 425-a and GTP-U 425-b, on the user datagram protocol (UDP) layer using UDP 430-a and UDP 430-b, on the internet protocol (IP) layer using IP 435-a and IP 435-b, on layers 2 and 1 (L2/L1) using L2/L1 440-a and L2/L1 440-b, or on some combination of these or other layers. In some cases, the CU 405 may communicate directly with the UE 420 on a packet data convergence protocol (PDCP) layer (not shown). Similarly, the donor base station 410 may communicate directly with the UE 420 on the RLC high (RLC-Hi) layer, using RLC-Hi 445-a and RLC-Hi 445-b. The donor base station 410, relay base stations 415, and UE 420 may additionally communicate via hopping on the RLC low (RLC-Lo) layer (e.g., using RLC-Lo 450-a, 450-b, 450-c, 450-d, 450-e, and 450-f), the MAC layer (e.g., using MAC 455-a, 455-b, 455-c, 455-d, 455-e, and 455-f), the PHY layer (e.g., using PHY 460-a, 460-b, 460-c, 460-d, 460-e, and 460-f), or some combination of these or other layers.

As illustrated, the RLC layer may be split into two portions. The first portion, or upper portion, may be the RLC-Hi 445, and may be transmitted end-to-end (e.g., between the UE 420 and the donor base station 410, as illustrated, or between a last relay base station 415, such as relay base station 415-b, and the donor base station 410). The second portion, or lower portion, may be the RLC-Lo 450, and may be transmitted hop-by-hop (e.g., between each wireless device in the backhaul chain). RLC-Hi 445 may contain sequence numbers for each RLC data unit (e.g., each RLC SDU) and may perform automatic repeat request (ARQ) processes for logical channels 470 that support acknowledged modes. RLC-Lo 450 may perform RLC PDU segmentation as a just-in-time (JIT) process, for example, if a data packet for transmission does not fit into a designated transport block (TB). The RLC-Lo 450 may be closely coupled with the MAC 455 and may be transmitted as part of or an extension of the MAC layer. In some cases, splitting the RLC may reduce complexity at the relay base stations 415, as RLC-Hi data does not need to be received and transmitted at each relay base station 415. This may allow for setup of more efficient and low-cost relay devices.

However, such an arrangement may result in congestion at one or more nodes in the wireless network 400 between the RLC-Hi 445 end points. For example, downlink data throughput may be greater on logical channel 470-a between the donor base station 410 and relay base station 415-a than on logical channel 470-b between relay base station 415-a and relay base station 415-b. This may create a bottleneck at relay base station 415-a, as relay base station 415-a receives more data packets than it transmits. Relay base station 415-a may store these data packets in a buffer for forwarding to relay base station 415-b on logical channel 470-b, but due to the lower throughput on logical channel 470-b, the buffer may fill up and, in some cases, result in buffer overflow. In some cases, the scheduler for each logical channel 470 may be located on the receiver side for uplink transmissions. In these cases, the scheduler may throttle uplink traffic to avoid or mitigate buffer overload. However, as the scheduler may be located on the transmitter side for downlink transmissions, the scheduler may not identify when to throttle downlink traffic. Instead, for RLC-Hi 445, the UE 420 may use ARQ to handle this congestion. For example, if buffer overflow occurs and the UE 420 does not receive one or more data packets, the UE 420 may transmit ARQ to request that the missing data packets are retransmitted. However, as RLC-Lo 450 does not support ARQ, the nodes may not utilize this technique to handle data congestion on the downlink.

To handle data congestion (e.g., RLC-Lo 450 data congestion on the downlink), the wireless network 400 may implement backpressure signaling. This backpressure signaling may be transmitted on the uplink to indicate to the scheduler on the uplink-side to throttle downlink data transmission. For example, the backpressure signaling may be sent on the MAC layer or the PHY layer, as these layers are transmitted using backhaul hopping from node-to-node. The backpressure signaling may be an example of a backpressure report or backpressure report message, which may indicate a logical channel 470. For example, relay base station 415-a may send a backpressure report to donor base station 410 indicating logical channel 470-*a*. The donor base station 410 may decrease the downlink traffic on logical channel 470-*a* (e.g., halting all traffic on logical channel 470-*a*, reducing the scheduling rate on logical channel 470-*a*, etc.) in response to the backpressure report. By reducing the scheduling rate of downlink data packets on logical channel 470-*a*, the wireless network 400 may mitigate data congestion at relay base station 415-*a*, avoiding buffer overload for the packets to transmit on logical channel 470-*b*.

Figure 5:
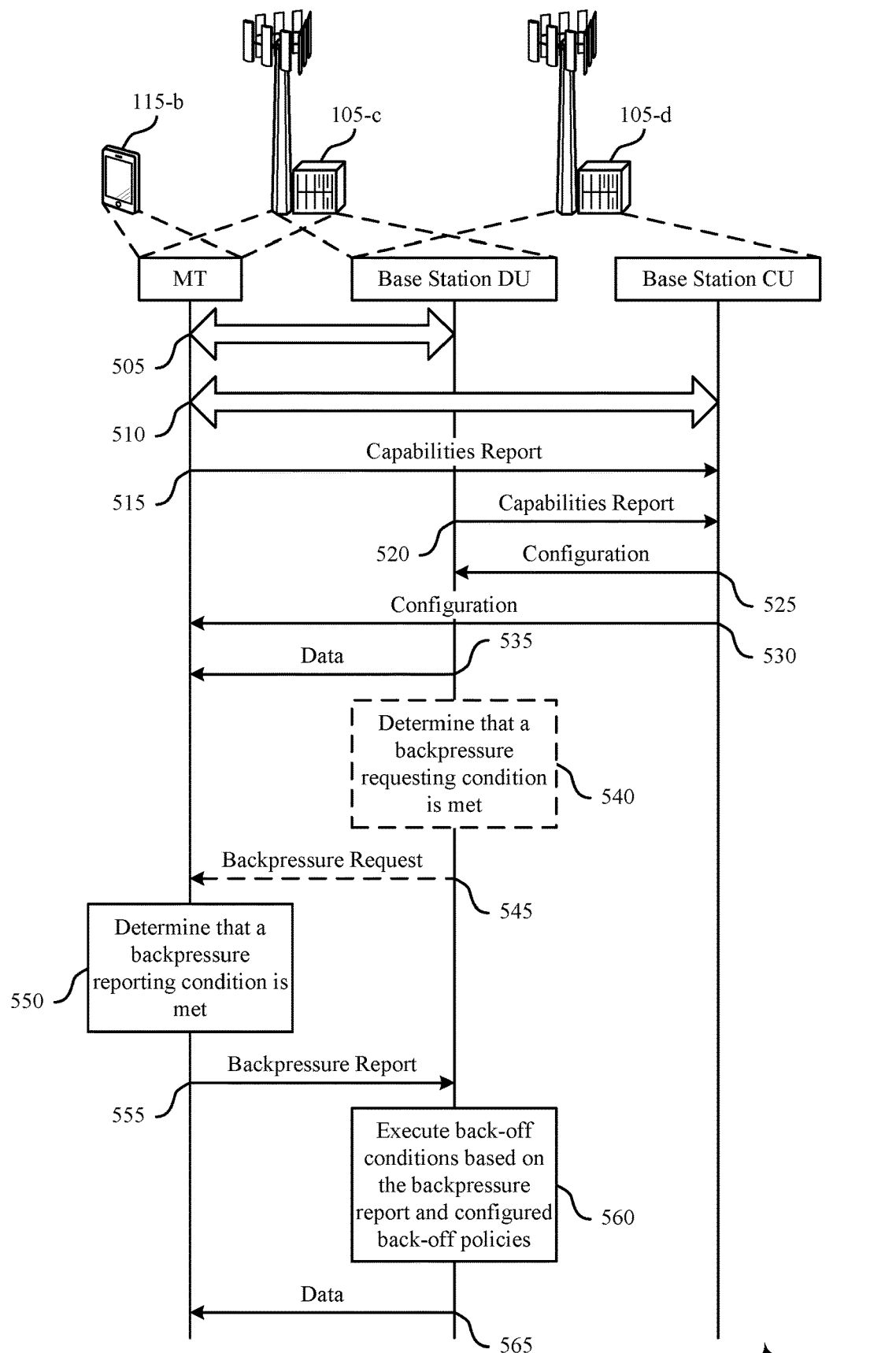
FIG. 5 illustrates an example of a process flow that supports backpressure signaling for wireless communications in accordance with aspects of the present disclosure.

FIG. 5 illustrates a process flow 500 that supports backpressure signaling for wireless communications in accordance with aspects of the present disclosure. Process flow 500 may include UE 115-*b*, relay base station 105-*c*, donor base station 105-*d*, or some combination of these wireless devices, which may be examples of the corresponding devices described with reference to FIGS. 1 through 4. UE 115-*b* or relay base station 105-*c* may operate as an MT endpoint for an access link, while relay base station 105-*c* or donor base station 105-*d* may operate as a base station DU endpoint for the access link. The donor base station 105-*d* may operate as a bridge between the base station CU and the base station DU. In some cases, the base station CU may be a component of a database, data center, or cloud network. The base station DU and base station CU may form an F1 association (e.g., an L3 signaling channel), while the base station DU and MT may form an RLC channel between two devices adjacent within the RLC channel chain. In some cases, the system may include any number of additional MTs or base station DUs operating within a backhaul hopping framework. In some implementations, the processes described below may be performed in a different order, or may include one or more additional or alternative processes performed by the wireless devices.

At 505, the MT may establish a signaling channel with the base station DU. This signaling channel may be an example of an L2 signaling channel, and may be between UE 115-*b* and relay base station 105-*c*, between UE 115-*b* and donor base station 105-*d*, between a first relay base station 105 and a second relay base station 105, or between relay base station 105-*c* and donor base station 105-*d*.

At 510, the MT may establish a signaling channel with the base station CU. This signaling channel may be an example of an L3 signaling channel, and may be between UE 115-*b* and the base station CU, or between relay base station 105-*c* and the base station CU.

At 515, the MT may transmit a backpressure capabilities message or capabilities report to the base station CU. In some cases, the MT may transmit an indication of its backpressure capabilities along with other capabilities in a combined capabilities report. For example, the reported backpressure capabilities may include a buffer size per link, per logical channel, per logical channel group, or some combination thereof.

At 520, the base station DU may transmit a backpressure capabilities message or capabilities report to the base station CU. For example, the base station DU may report its support for backpressure signaling. In some cases, the capabilities reports transmitted at 515 and 520 may be combined into a single capabilities report for a wireless device. For example, relay base station 105-*c* may operate as both an MT endpoint and a base station DU endpoint for different RLC channels, and may accordingly transmit backpressure capabilities for both of these operations to the base station CU.

At 525, the base station CU may transmit a configuration for RLC channels, backpressure requests, back-off policies, or some combination of these to the base station DU. In some cases, the back-off policies may be based on a buffer size reported by the MT (e.g., at 515).

At 530, the base station CU may transmit a configuration of RLC channels, backpressure report conditions, or a combination thereof to the MT. These report conditions may include trigger conditions for the MT to transmit a backpressure report. In some cases, the configurations performed at 525 and 530 may be combined into a single configuration for a wireless device. For example, the base station CU may configure a relay base station 105-*c* to operate as both an MT endpoint and a base station DU endpoint for different RLC channels. The capabilities reports and configurations may be transmitted and received on an L3 signaling connection (e.g., as an L3 message), an RRC connection, an F1 AP interface, or some combination of these connections.

At 535, the base station DU may transmit downlink data to the MT (e.g., according to the configurations). This data may be transmitted by the base station DU as PDUs, and received by the MT as SDUs. A scheduler at the base station DU may determine a scheduling rate for the downlink transmissions, and the base station DU may transmit the data according to the scheduling rate.

In some cases, at 540, the base station DU may determine that a backpressure requesting condition is met. For example, the base station DU may periodically or aperiodically test one or more backpressure requesting conditions, that may be configured based on the configuration at 525. For example, the base station DU may test whether a certain time interval (e.g., a pre-determined or dynamic time interval) has passed following a decrease in the downlink scheduling rate.

At 545, if the base station DU determines that at least one backpressure requesting condition is met, the base station DU may transmit a backpressure request message to the MT. This backpressure request message may be sent in a MAC signaling message. For example, the backpressure request message may be transmitted in a MAC channel element on a PDSCH or in a downlink channel indicator on a PDCCH.

At 550, the MT may determine that a backpressure reporting condition is met. For example, this determination may occur based on a periodic or aperiodic test of the backpressure reporting conditions or may be triggered (e.g., by receiving certain signals). These backpressure reporting conditions may include periodic reporting conditions, buffer load-based reporting conditions, request-based reporting conditions, or some combination of these or other reporting conditions. In periodic reporting, the MT may determine to send a backpressure report based on a specific amount of time elapsing since a most recent backpressure report transmission or a most recent periodic backpressure report transmission. In buffer-load based reporting, the MT may determine to transmit a backpressure report based on a buffer load value exceeding a buffer load threshold. This may include a buffer load measurement surpassing a buffer load threshold, a buffer load availability measurement falling below a buffer load availability threshold, a buffer load value for a specific temporal averaging window surpassing a buffer load threshold, a buffer load value surpassing a hysteresis value, or some combination of these buffer load measurements. While these describe conditions for backpressure reporting in order to throttle downlink transmissions, the MT may additionally implement buffer-load based reporting conditions for increasing downlink transmission rates on the logical channel (e.g., if the buffer load is relatively low). In request-based reporting, if the MT receives a backpressure request message (e.g., at 545), a backpressure report transmission may be triggered.

At 555, the MT may transmit a backpressure report message to the base station DU (e.g., based on at least one backpressure reporting condition being met). This backpressure report message may indicate the logical channel (e.g., with a logical channel identifier, with a logical channel group identifier, or by being transmitted on the corresponding logical channel) and may include buffer load information (e.g., an indication of a buffer overload, a load indicator value, an explicit buffer load value (e.g., in bytes), or some similar indication of the load in the logical channel-specific data buffer). The backpressure report message may be transmitted in a MAC signaling message. For example, the backpressure report message may be transmitted in a MAC channel element on a PUSCH or in an uplink channel indicator on a PUCCH.

At 560, the base station DU may execute one or more back-off conditions based on the received backpressure report message and configured back-off policies. In some cases, the base station DU may step down the rate of downlink transmission on the indicated logical channel to a lower scheduling rate, or may stop downlink transmissions on the indicated logical channel for a certain time interval. In some examples, the base station DU may gradually ramp back up the downlink transmissions on the logical channel over time. In other cases, the base station DU may increase the rate of downlink transmission on the indicated logical channel based on the backpressure report.

At 565, the base station DU may transmit additional downlink data to the MT according to the adjusted scheduling rate. For example, if the base station DU backs-off the downlink transmission on the logical channel based on the backpressure report, the base station DU may transmit MAC PDUs at a lower scheduling rate than before, and the MT may accordingly receive MAC SDUs at the lower scheduling rate. This may allow the MT to reduce the load in the buffer for the indicated logical channel.

Figure 6:
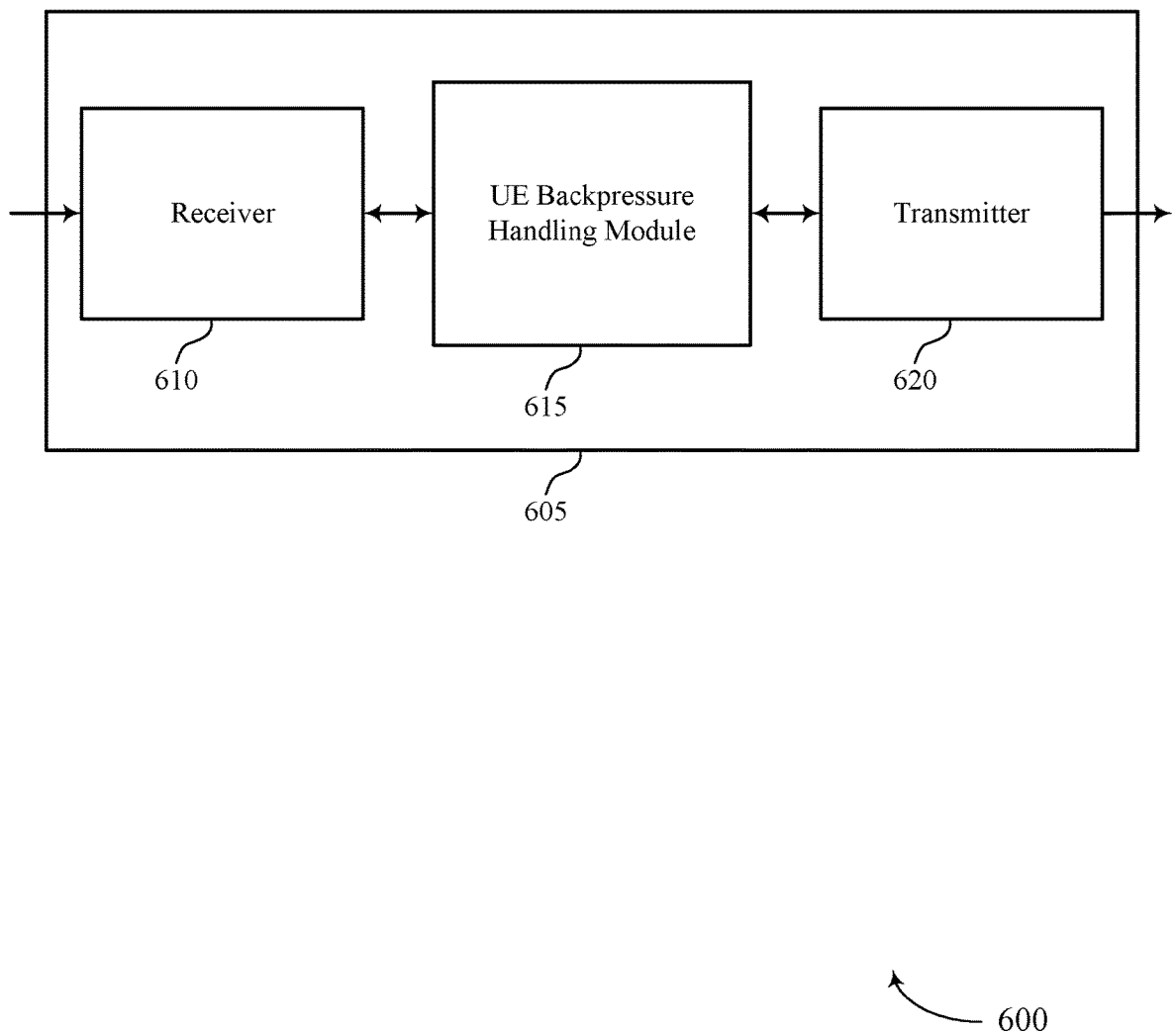
FIGS. 6 and 7 show block diagrams of a wireless device that supports backpressure signaling for wireless communications in accordance with aspects of the present disclosure.

FIG. 6 shows a block diagram 600 of a wireless device 605 that supports backpressure signaling for wireless communications in accordance with aspects of the present disclosure. Wireless device 605 may be an example of aspects of a UE 115 (e.g., operating as an MT) as described herein. Wireless device 605 may include receiver 610, UE backpressure handling module 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to backpressure signaling for wireless communications, etc.). Information may be passed on to other components of the device. The receiver 610 may be an example of aspects of the transceiver 935 described with reference to FIG. 9. The receiver 610 may utilize a single antenna or a set of antennas.

UE backpressure handling module 615 may be an example of aspects of the UE backpressure handling module 915 described with reference to FIG. 9. UE backpressure handling module 615 may receive data units in a logical channel of a wireless link according to a scheduling rate, determine that a backpressure report condition of the logical channel is met, transmit, on the wireless link, a backpressure report message indicating the logical channel based on the determining, and receive additional data units in the logical channel of the wireless link according to an adjusted scheduling rate based on transmitting the backpressure report message.

UE backpressure handling module 615 and/or at least some of its various sub-components may be implemented in hardware, software executed by a processor, firmware, or any combination thereof. If implemented in software executed by a processor, the functions of the UE backpressure handling module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE backpressure handling module 615 and/or at least some of its various sub-components may be physically located at various positions, including being distributed such that portions of functions are implemented at different physical locations by one or more physical devices. In some examples, UE backpressure handling module 615 and/or at least some of its various sub-components may be a separate and distinct component in accordance with various aspects of the present disclosure. In other examples, UE backpressure handling module 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
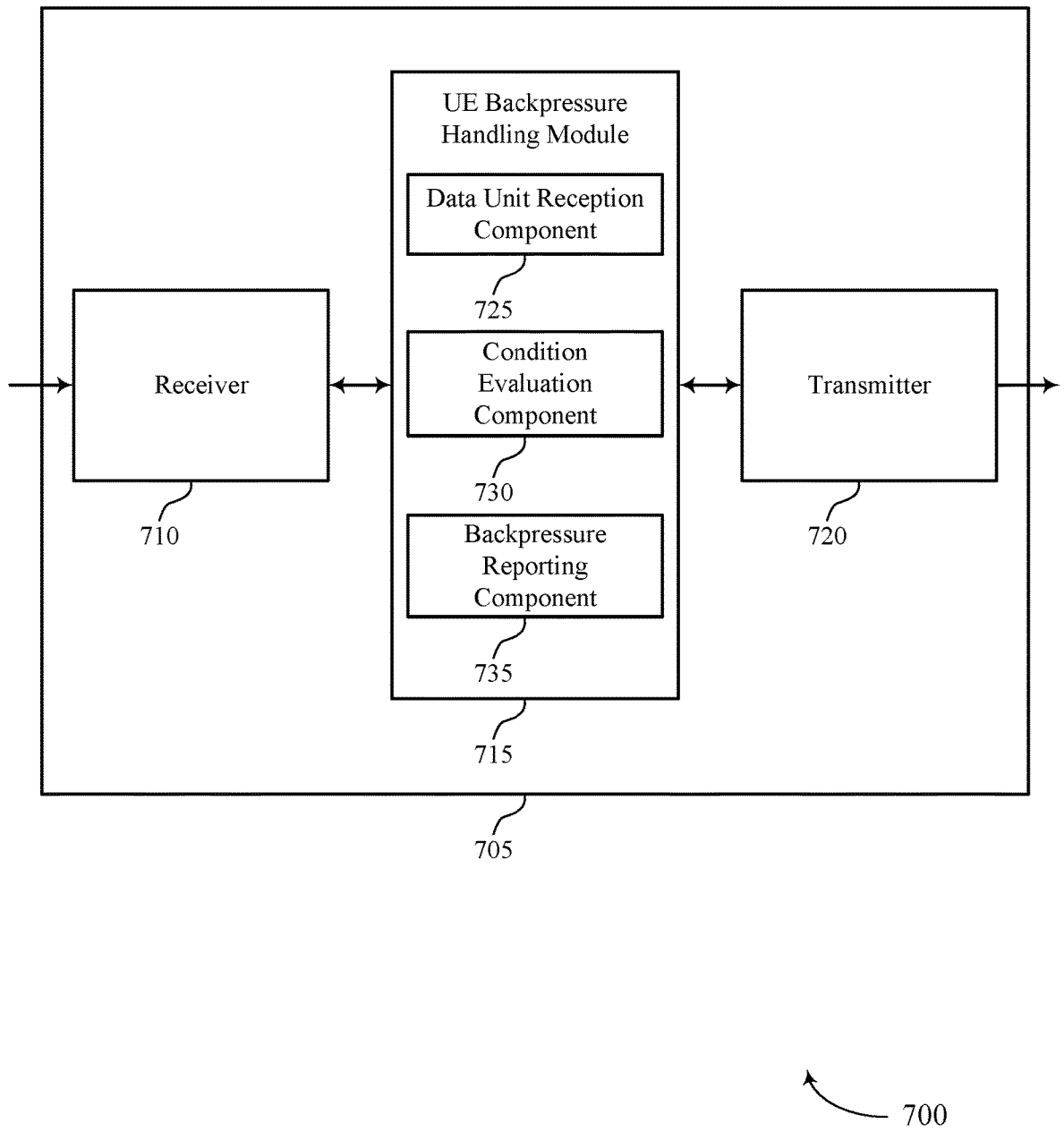

FIG. 7 shows a block diagram 700 of a wireless device 705 that supports backpressure signaling for wireless communications in accordance with aspects of the present disclosure. Wireless device 705 may be an example of aspects of a wireless device 605 or a UE 115 (e.g., operating as an MT) as described with reference to FIGS. 1 through 6. Wireless device 705 may include receiver 710, UE backpressure handling module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to backpressure signaling for wireless communications, etc.). Information may be passed on to other components of the device. The receiver 710 may be an example of aspects of the transceiver 935 described with reference to FIG. 9. The receiver 710 may utilize a single antenna or a set of antennas.

UE backpressure handling module 715 may be an example of aspects of the UE backpressure handling module 915 described with reference to FIG. 9. UE backpressure handling module 715 may also include data unit reception component 725, condition evaluation component 730, and backpressure reporting component 735.

Data unit reception component 725 may receive data units in a logical channel of a wireless link according to a scheduling rate. Condition evaluation component 730 may determine that a backpressure report condition of the logical channel is met. Backpressure reporting component 735 may transmit, on the wireless link, a backpressure report message indicating the logical channel based on the determining. Data unit reception component 725 may receive additional data units in the logical channel of the wireless link according to an adjusted scheduling rate based on transmitting the backpressure report message.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
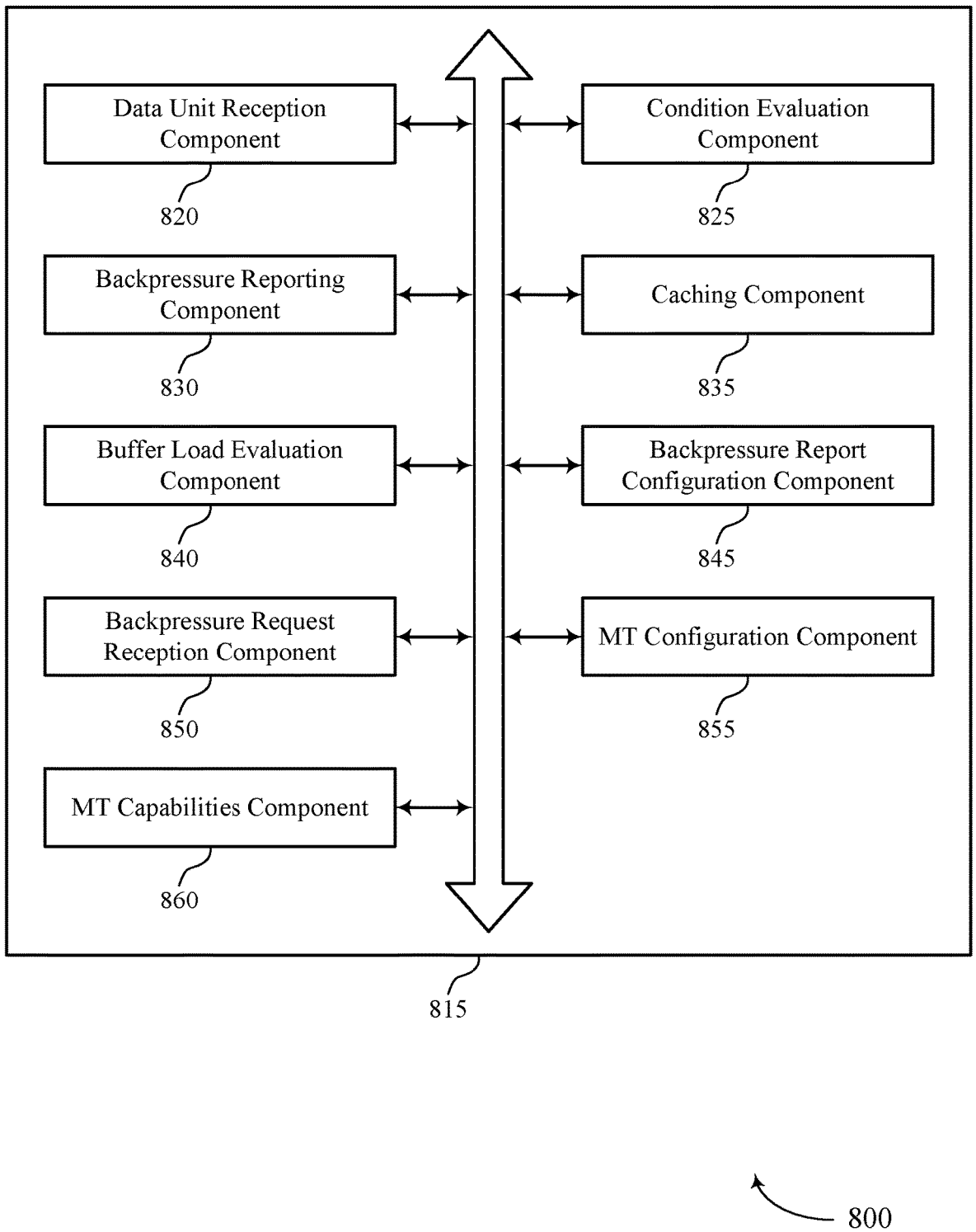
FIG. 8 shows a block diagram of a user equipment (UE) backpressure handling module that support backpressure signaling for wireless communications in accordance with aspects of the present disclosure.

FIG. 8 shows a block diagram 800 of a UE backpressure handling module 815 that supports backpressure signaling for wireless communications in accordance with aspects of the present disclosure. The UE backpressure handling module 815 may be an example of aspects of a UE backpressure handling module 615, a UE backpressure handling module 715, or a UE backpressure handling module 915 described with reference to FIGS. 6, 7, and 9. The UE backpressure handling module 815 may include data unit reception component 820, condition evaluation component 825, backpressure reporting component 830, caching component 835, buffer load evaluation component 840, backpressure report configuration component 845, backpressure request reception component 850, MT configuration component 855, and MT capabilities component 860. Each of these modules may communicate, directly or indirectly, with one another (e.g., via one or more buses).

Data unit reception component 820 may receive data units in a logical channel of a wireless link according to a scheduling rate and may receive additional data units in the logical channel of the wireless link according to an adjusted scheduling rate based on transmitting a backpressure report message. In some cases, the adjusted scheduling rate is a decreased scheduling rate that is lower than the scheduling rate or an increased scheduling rate that is greater than the scheduling rate. In some cases, receiving the additional data units in the logical channel of the wireless link according to the adjusted scheduling rate includes receiving the additional data units after a temporary halting of data unit transmissions. In some cases, the data units include downlink MAC SDUs received on a PDSCH. In some cases, the logical channel is an example of an RLC channel, an RLC-bearer, an RLC-bearer chain, or a combination thereof.

Condition evaluation component 825 may determine that a backpressure report condition of the logical channel is met. Backpressure reporting component 830 may transmit, on the wireless link, a backpressure report message indicating the logical channel based on the determining. In some cases, the backpressure report message includes a MAC signaling message. In some cases, transmitting the backpressure report message includes transmitting the MAC signaling message in a MAC channel element on a PUSCH, in an uplink channel indicator on a PUCCH, or in a combination thereof.

Caching component 835 may cache a data payload of the received data units in a buffer corresponding to the logical channel. In some cases, determining that the backpressure report condition of the logical channel is met includes buffer load evaluation component 840 comparing a buffer load value to a buffer load threshold, a buffer load availability to a buffer load availability threshold, or a combination thereof.

In some cases, the logical channel corresponds to a logical channel identifier. Backpressure report configuration component 845 may configure the backpressure report message with the logical channel identifier, a logical channel group identifier corresponding to a logical channel group including the logical channel, or a combination thereof, where the backpressure report message indicates the logical channel based on the logical channel identifier, the logical channel group identifier, or the combination thereof. Additionally or alternatively, backpressure report configuration component 845 may configure the backpressure report message with buffer load information. In some cases, the buffer load information includes a backpressure indicator, a backpressure indicator value, a buffer load value, a buffer load availability indicator, or a combination thereof.

In some cases, determining that the backpressure report condition of the logical channel is met includes backpressure request reception component 850 receiving a backpressure request message indicating the logical channel, where transmitting the backpressure report message is based on a request-based condition.

MT configuration component 855 may receive a configuration for the logical channel, where the configuration includes one or more backpressure report conditions. In some cases, determining that the backpressure report condition of the buffer is met is based on the configuration. In some cases, the one or more backpressure report conditions include periodic reporting conditions, buffer load-based reporting conditions, request-based reporting conditions, or a combination thereof. In some cases, the one or more backpressure report conditions further include indications of time intervals for periodic reporting, buffer load thresholds for buffer load-based reporting, buffer load availability thresholds for the buffer load-based reporting, averaging windows for the buffer load-based reporting, hysteresis values for the buffer load-based reporting, or a combination thereof. In some cases, the configuration is received on an L3 signaling connection, an RRC connection, an F1 AP interface, or a combination thereof.

MT capabilities component 860 may transmit a backpressure capabilities message to a base station CU. In some cases, the backpressure capabilities message includes at least one buffer size value. In some cases, the backpressure capabilities message is transmitted on an L3 signaling connection, an RRC connection, an F1 AP interface, or a combination thereof.

Figure 9:
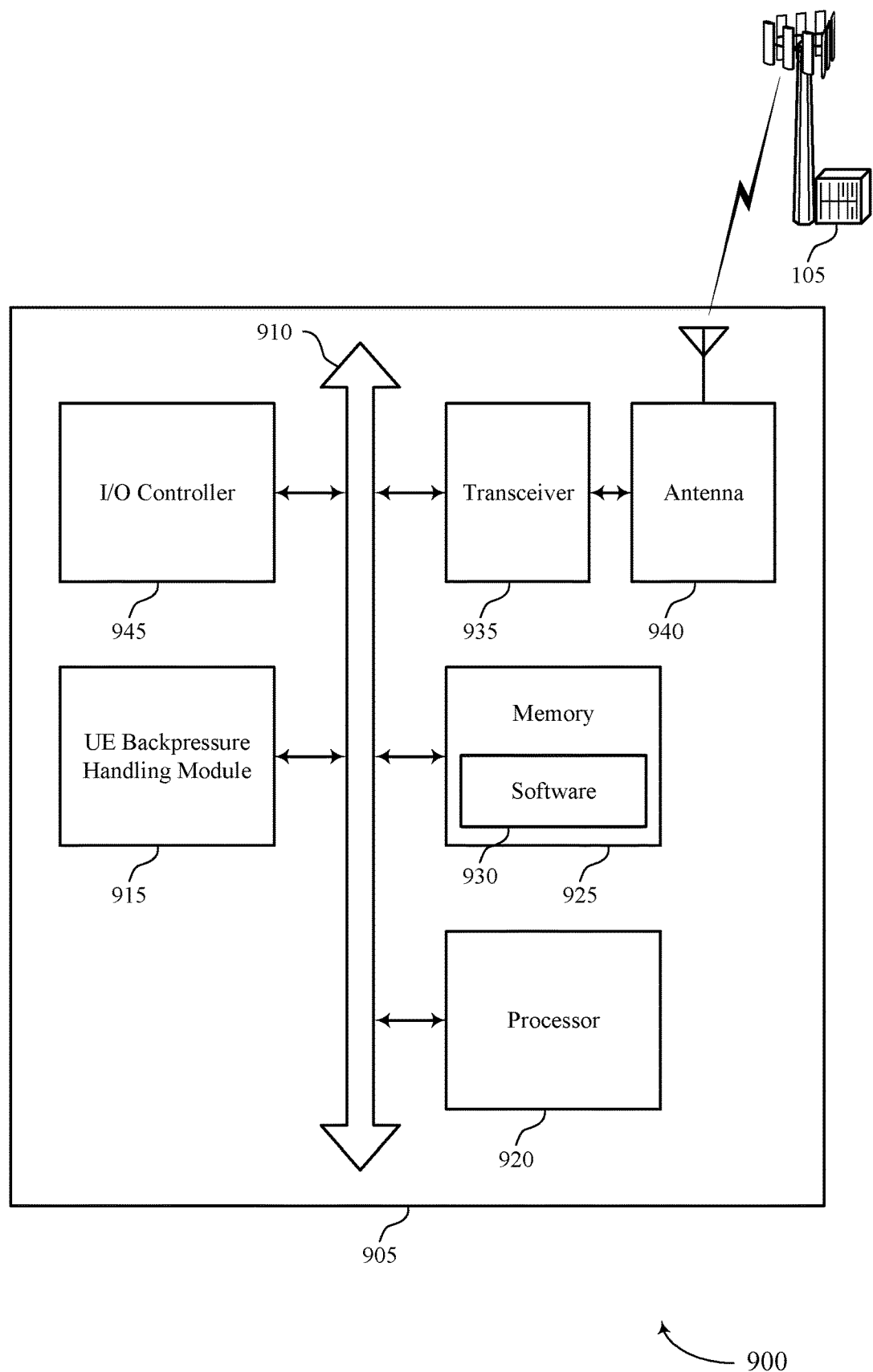
FIG. 9 shows a diagram of a system including a device (e.g., a UE) that supports backpressure signaling for wireless communications in accordance with aspects of the present disclosure.

FIG. 9 shows a diagram of a system 900 including a device 905 that supports backpressure signaling for wireless communications in accordance with aspects of the present disclosure. Device 905 may be an example of or include the components of wireless device 605, wireless device 705, or a UE 115 as described above, e.g., with reference to FIGS. 1 through 7. Device 905 may operate as an MT endpoint. Device 905 may include components for bi-directional voice and data communications including components for transmitting and receiving communications, including UE backpressure handling module 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

UE backpressure handling module 915 may perform one or more of the functions described herein with reference to UE backpressure handling module 615, UE backpressure handling module 715, or UE backpressure handling module 815 as described with reference to FIGS. 6 through 8.

Processor 920 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting backpressure signaling for wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support backpressure signaling for wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
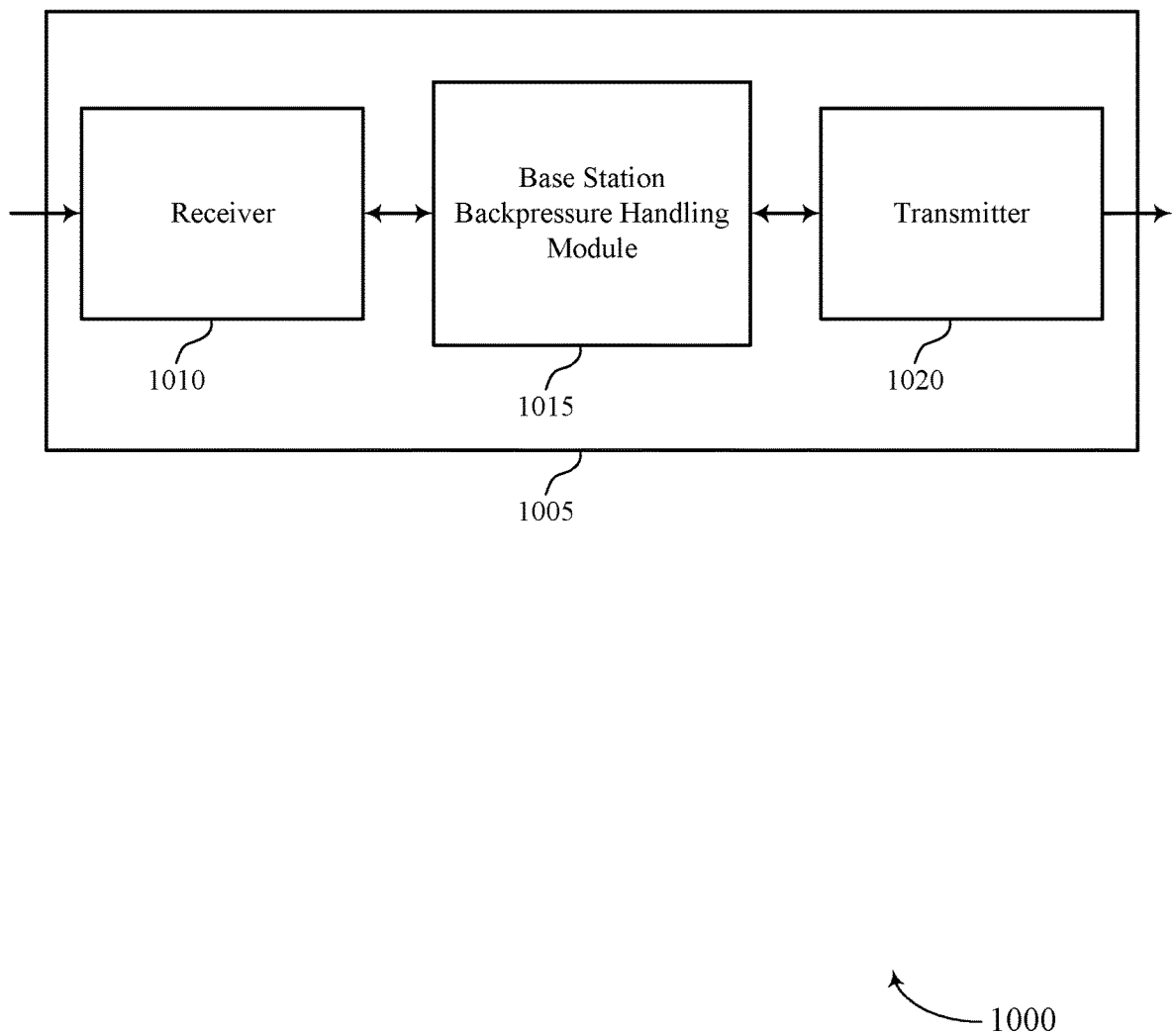
FIGS. 10 and 11 show block diagrams of a wireless device that supports backpressure signaling for wireless communications in accordance with aspects of the present disclosure.

FIG. 10 shows a block diagram 1000 of a wireless device 1005 that supports backpressure signaling for wireless communications in accordance with aspects of the present disclosure. Wireless device 1005 may be an example of aspects of a base station 105 (e.g., a relay base station operating as an MT, a relay base station or donor base station operating as a base station DU, or a base station operating as a base station CU) as described herein. Wireless device 1005 may include receiver 1010, base station backpressure handling module 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to backpressure signaling for wireless communications, etc.). Information may be passed on to other components of the device. The receiver 1010 may be an example of aspects of the transceiver 1335 described with reference to FIG. 13. The receiver 1010 may utilize a single antenna or a set of antennas.

Base station backpressure handling module 1015 may be an example of aspects of the base station backpressure handling module 1315 described with reference to FIG. 13.

Base station backpressure handling module 1015 and/or at least some of its various sub-components may be implemented in hardware, software executed by a processor, firmware, or any combination thereof. If implemented in software executed by a processor, the functions of the base station backpressure handling module 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station backpressure handling module 1015 and/or at least some of its various sub-components may be physically located at various positions, including being distributed such that portions of functions are implemented at different physical locations by one or more physical devices. In some examples, base station backpressure handling module 1015 and/or at least some of its various sub-components may be a separate and distinct component in accordance with various aspects of the present disclosure. In other examples, base station backpressure handling module 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases (e.g., when operating as an MT), base station backpressure handling module 1015 may receive data units in a logical channel of a wireless link according to a scheduling rate, determine that a backpressure report condition of the logical channel is met, transmit, on the wireless link, a backpressure report message indicating the logical channel based on the determining, and receive additional data units in the logical channel of the wireless link according to an adjusted scheduling rate based on transmitting the backpressure report message. These processes may be performed by a wireless node with a wireless link controlled by a MAC scheduler.

In other cases (e.g., when operating as a base station DU), base station backpressure handling module 1015 may transmit data units in a logical channel of a wireless link according to a scheduling rate, receive a backpressure report message indicating the logical channel, and adjust the scheduling rate for transmitting the data units in the logical channel based on the backpressure report message. These processes may be performed by a wireless node with a MAC scheduler to control the downlink scheduling rate on a wireless link.

In yet other cases (e.g., when operating as a base station CU), base station backpressure handling module 1015 may identify a first wireless device operating as an MT endpoint and a second wireless device operating as a base station DU endpoint for backpressure handling configuration, transmit, to the first wireless device, a first configuration for a logical channel, the first configuration including one or more backpressure report conditions for the logical channel, and transmit, to the second wireless device, a second configuration for the logical channel, the second configuration including one or more back-off policies for the logical channel. These processes may be performed by a network node for configuring backpressure signaling on wireless nodes.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
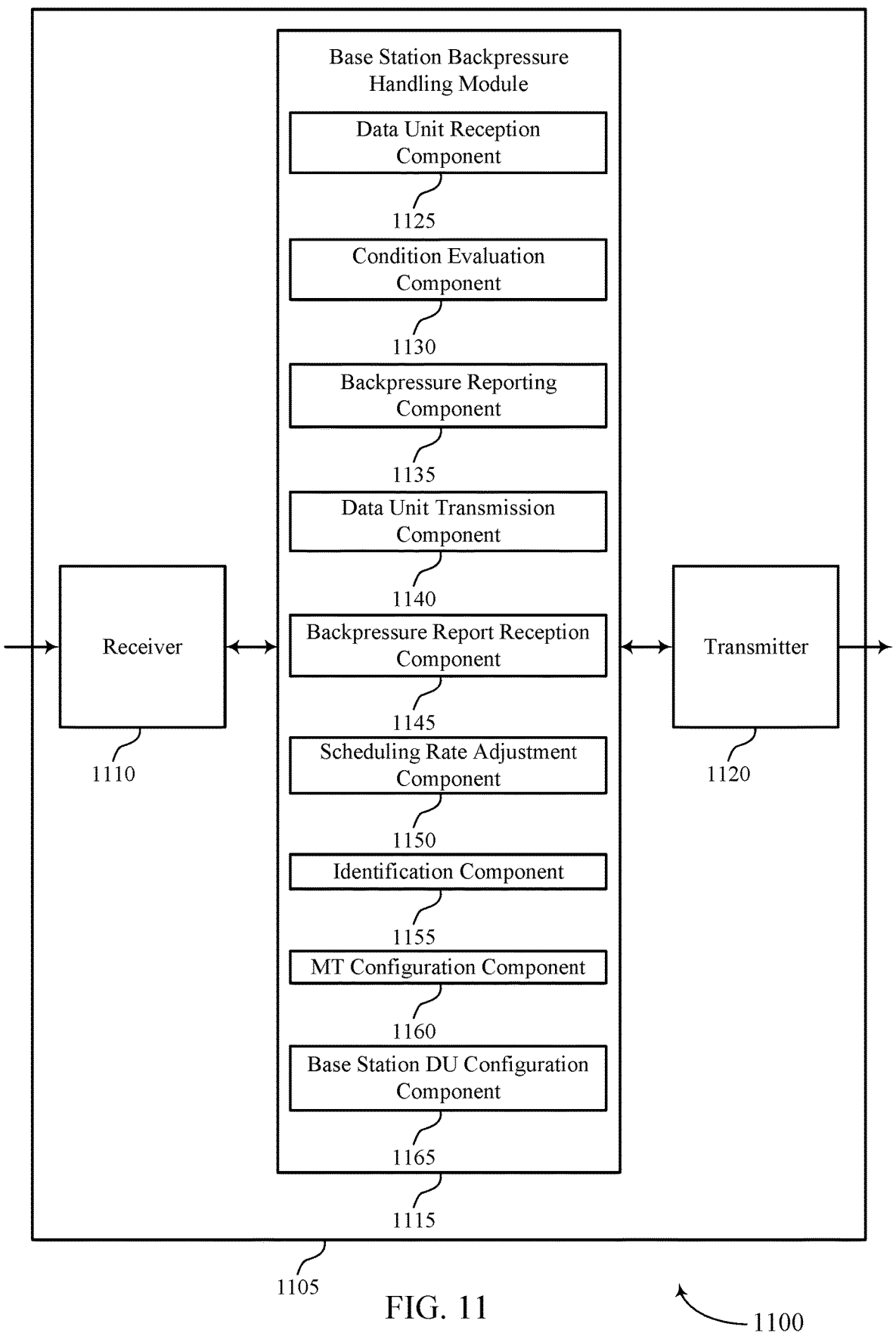

FIG. 11 shows a block diagram 1100 of a wireless device 1105 that supports backpressure signaling for wireless communications in accordance with aspects of the present disclosure. Wireless device 1105 may be an example of aspects of a wireless device 1005 or a base station 105 as described with reference to FIGS. 1 through 5 and 10. Wireless device 1105 may include receiver 1110, base station backpressure handling module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to backpressure signaling for wireless communications, etc.). Information may be passed on to other components of the device. The receiver 1110 may be an example of aspects of the transceiver 1335 described with reference to FIG. 13. The receiver 1110 may utilize a single antenna or a set of antennas.

Base station backpressure handling module 1115 may be an example of aspects of the base station backpressure handling module 1315 described with reference to FIG. 13.

Base station backpressure handling module 1115 may also include data unit reception component 1125, condition evaluation component 1130, backpressure reporting component 1135, data unit transmission component 1140, backpressure report reception component 1145, scheduling rate adjustment component 1150, identification component 1155, MT configuration component 1160, base station DU configuration component 1165, or some combination of these components.

In a first example, data unit reception component 1125 may receive data units in a logical channel of a wireless link according to a scheduling rate. Condition evaluation component 1130 may determine that a backpressure report condition of the logical channel is met. Backpressure reporting component 1135 may transmit, on the wireless link, a backpressure report message indicating the logical channel based on the determining. Data unit reception component 1125 may receive additional data units in the logical channel of the wireless link according to an adjusted scheduling rate based on transmitting the backpressure report message.

In a second example, data unit transmission component 1140 may transmit data units in a logical channel of a wireless link according to a scheduling rate. Backpressure report reception component 1145 may receive a backpressure report message indicating the logical channel. Scheduling rate adjustment component 1150 may adjust the scheduling rate for transmitting the data units in the logical channel based on the backpressure report message.

In a third example, identification component 1155 may identify a first wireless device operating as an MT endpoint and a second wireless device operating as a base station DU endpoint for backpressure handling configuration. MT configuration component 1160 may transmit, to the first wireless device, a first configuration for a logical channel, the first configuration including one or more backpressure report conditions for the logical channel. Base station DU configuration component 1165 may transmit, to the second wireless device, a second configuration for the logical channel, the second configuration including one or more back-off policies for the logical channel.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
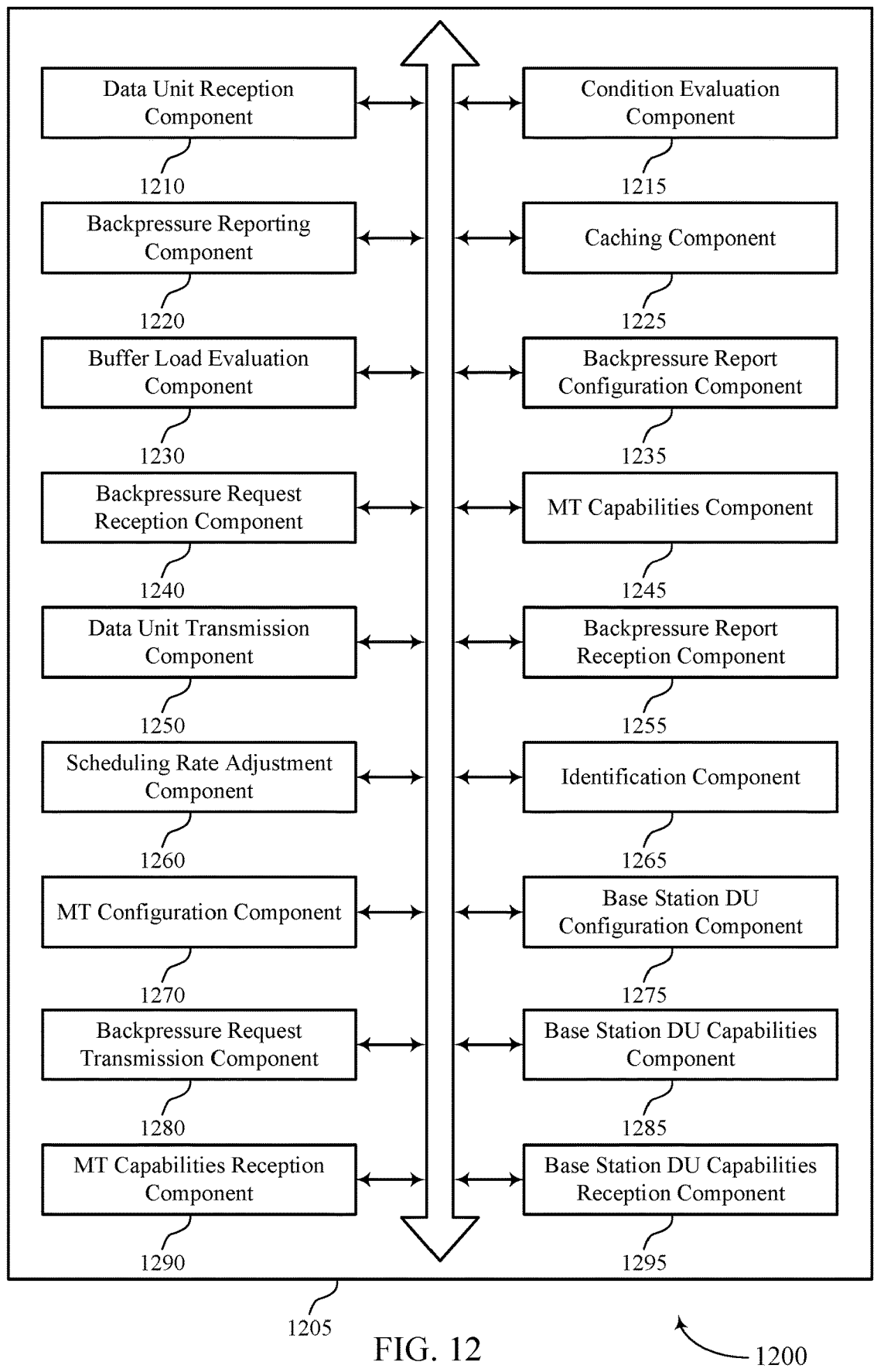
FIG. 12 shows a block diagram of a base station backpressure handling module that support backpressure signaling for wireless communications in accordance with aspects of the present disclosure.

FIG. 12 shows a block diagram 1200 of a base station backpressure handling module 1205 that supports backpressure signaling for wireless communications in accordance with aspects of the present disclosure. The base station backpressure handling module 1205 may be an example of aspects of a base station backpressure handling module 1015, a base station backpressure handling module 1115, or a base station backpressure handling module 1315 described with reference to FIGS. 10, 11, and 13. The base station backpressure handling module 1205 may include data unit reception component 1210, condition evaluation component 1215, backpressure reporting component 1220, caching component 1225, buffer load evaluation component 1230, backpressure report configuration component 1235, backpressure request reception component 1240, MT capabilities component 1245, data unit transmission component 1250, backpressure report reception component 1255, scheduling rate adjustment component 1260, identification component 1265, MT configuration component 1270, base station DU configuration component 1275, backpressure request transmission component 1280, base station DU capabilities component 1285, MT capabilities reception component 1290, base station DU capabilities reception component 1295, or any combination of these components. Each of these modules may communicate, directly or indirectly, with one another (e.g., via one or more buses).

In some cases (e.g., if the base station is operating as an MT endpoint), data unit reception component 1210 may receive data units in a logical channel of a wireless link according to a scheduling rate and may receive additional data units in the logical channel of the wireless link according to an adjusted scheduling rate based on transmitting a backpressure report message. In some cases, the adjusted scheduling rate is a decreased scheduling rate that is lower than the scheduling rate or an increased scheduling rate that is higher than the scheduling rate. In some cases, receiving the additional data units in the logical channel of the wireless link according to the adjusted scheduling rate includes receiving the additional data units after a temporary halting of data units transmissions. In some cases, the data units include downlink MAC SDUs received on a PDSCH. In some cases, the logical channel is an example of an RLC channel, an RLC-bearer, an RLC-bearer chain, or a combination thereof.

Condition evaluation component 1215 may determine that a backpressure report condition of the logical channel is met. Backpressure reporting component 1220 may transmit, on the wireless link, a backpressure report message indicating the logical channel based on the determining. In some cases, the backpressure report message includes a MAC signaling message. In some cases, transmitting the backpressure report message includes transmitting the MAC signaling message in a MAC channel element on a PUSCH, in an uplink channel indicator on a PUCCH, or in a combination thereof.

Caching component 1225 may cache a data payload of the received data units in a buffer corresponding to the logical channel. In some cases, determining that the backpressure report condition of the logical channel is met includes buffer load evaluation component 1230 comparing a buffer load value to a buffer load threshold, a buffer load availability to a buffer load availability threshold, or a combination thereof.

In some cases, the logical channel corresponds to a logical channel identifier. Backpressure report configuration component 1235 may configure the backpressure report message with the logical channel identifier, a logical channel group identifier corresponding to a logical channel group including the logical channel, or a combination thereof, where the backpressure report message indicates the logical channel based on the logical channel identifier, the logical channel group identifier, or the combination thereof. Additionally or alternatively, backpressure report configuration component 1235 may configure the backpressure report message with buffer load information. In some cases, the buffer load information includes a backpressure indicator, a backpressure indicator value, a buffer load value, a buffer load availability indicator, or a combination thereof.

In some cases, determining that the backpressure report condition of the logical channel is met includes backpressure request reception component 1240 receiving a backpressure request message indicating the logical channel, where transmitting the backpressure report message is based on a request-based condition.

MT configuration component 1270 may receive a configuration for the logical channel, where the configuration includes one or more backpressure report conditions. In some cases, determining that the backpressure report condition of the buffer is met is based on the configuration. In some cases, the one or more backpressure report conditions include periodic reporting conditions, buffer load-based reporting conditions, request-based reporting conditions, or a combination thereof. In some cases, the one or more backpressure report conditions further include indications of time intervals for periodic reporting, buffer load thresholds for buffer load-based reporting, buffer load availability thresholds for the buffer load-based reporting, averaging windows for the buffer load-based reporting, hysteresis values for the buffer load-based reporting, or a combination thereof. In some cases, the configuration is received on an L3 signaling connection, an RRC connection, an F1 AP interface, or a combination thereof.

MT capabilities component 1245 may transmit a backpressure capabilities message to a base station CU. In some cases, the backpressure capabilities message includes at least one buffer size value. In some cases, the backpressure capabilities message is transmitted on an L3 signaling connection, an RRC connection, an F1 AP interface, or a combination thereof.

In other cases (e.g., if the base station is operating as a base station DU endpoint), data unit transmission component 1250 may transmit data units in a logical channel of a wireless link according to a scheduling rate. In some cases, data unit transmission component 1250 may transmit additional data units in the logical channel of the wireless link according to an adjusted scheduling rate. In some cases, the data units include downlink MAC PDUs. The logical channel may be an example of an RLC channel, an RLC-bearer, an RLC-bearer chain, or a combination thereof.

Backpressure report reception component 1255 may receive a backpressure report message indicating the logical channel. In some cases, the logical channel corresponds to a logical channel identifier. In some cases, the backpressure report message includes the logical channel identifier, a logical channel group identifier corresponding to a logical channel group including the logical channel, or a combination thereof, and the backpressure report message indicates the logical channel using the logical channel identifier, the logical channel group identifier, or the combination thereof. In some cases, the backpressure report message includes buffer load information. In some cases, the buffer load information includes a backpressure indicator, a backpressure indicator value, a buffer load value, a buffer load availability indicator, or a combination thereof. The backpressure report message may be an example of a MAC signaling message. In some cases, receiving the backpressure report message includes receiving the MAC signaling message in a MAC channel element on a PUSCH, in an uplink channel indicator on a PUCCH, or in a combination thereof.

Scheduling rate adjustment component 1260 may adjust the scheduling rate for transmitting the data units in the logical channel based on the backpressure report message. In some cases, adjusting the scheduling rate involves decreasing the scheduling rate, increasing the scheduling rate, temporarily halting transmission of the data units, or a combination thereof. In some cases, adjusting the scheduling rate is based on the buffer load information.

Backpressure request transmission component 1280 may transmit a backpressure request message indicating the logical channel, where the backpressure report message is received based on the backpressure request message. In some cases, backpressure request transmission component 1280 may receive a configuration for the logical channel, where the configuration includes one or more trigger conditions for transmitting the backpressure request message.

Base station DU configuration component 1275 may receive a configuration for the logical channel, where the configuration includes one or more back-off policies for the logical channel. In some cases, the one or more back-off policies include indications of a step size, a ramping slope, or a combination thereof adjusting the scheduling rate. In some cases, the one or more back-off policies include a backpressure condition, a backpressure threshold, a buffer load threshold, a buffer load availability threshold, or a combination thereof, where adjusting the scheduling rate is based on the backpressure condition, the backpressure threshold, the buffer load threshold, the buffer load availability threshold, or the combination thereof. In some cases, the configuration is received on an L3 signaling connection, an RRC connection, an F1 AP interface, or a combination thereof.

Base station DU capabilities component 1285 may transmit a backpressure capabilities message to a base station CU. In some cases, the backpressure capabilities message is transmitted on an L3 signaling connection, an RRC connection, an F1 AP interface, or a combination thereof.

In yet other cases (e.g., if the base station is operating as a base station CU endpoint), identification component 1265 may identify a first wireless device operating as an MT endpoint and a second wireless device operating as a base station DU endpoint for backpressure handling configuration. In some cases, the first wireless device is a UE or a relay base station. In some cases, the second wireless device is a relay base station or a donor base station.

MT configuration component 1270 may transmit, to the first wireless device, a first configuration for a logical channel, the first configuration including one or more backpressure report conditions for the logical channel. In some cases, the logical channel is an example of an RLC channel, an RLC-bearer, an RLC-bearer chain, or a combination thereof. In some cases, the logical channel corresponds to a logical channel identifier, and the MT configuration component 1270 may configure the first configuration with the logical channel identifier, a logical channel group identifier corresponding to a logical channel group including the logical channel, or a combination thereof. In some cases, the one or more backpressure report conditions include periodic reporting conditions, buffer load-based reporting conditions, request-based reporting conditions, or a combination thereof. In some cases, the one or more backpressure report conditions further include indications of time intervals for periodic reporting, buffer load thresholds for buffer load-based reporting, buffer load availability thresholds for the buffer load-based reporting, averaging windows for the buffer load-based reporting, hysteresis values for the buffer load-based reporting, or a combination thereof.

Base station DU configuration component 1275 may transmit, to the second wireless device, a second configuration for the logical channel, the second configuration including one or more back-off policies for the logical channel. In some cases, base station DU configuration component 1275 may configure the second configuration with the logical channel identifier, the logical channel group identifier, or the combination thereof. In some cases, the one or more back-off policies include indications of a step size, a ramping slope, or a combination thereof for adjusting a data unit scheduling rate. In some cases, the one or more back-off policies include a backpressure condition, a backpressure threshold, a buffer load threshold, a buffer load availability threshold, or a combination thereof. In some cases, the second configuration for the logical channel includes one or more backpressure request conditions. In some cases, the first configuration and the second configuration are transmitted on an L3 signaling connection, an RRC connection, an F1 AP interface, or a combination thereof.

MT capabilities reception component 1290 may receive, from the first wireless device, a backpressure capabilities message indicating backpressure handling capabilities of the first wireless device. In some cases, the backpressure capabilities message is received on an L3 signaling connection, an RRC connection, an F1 AP interface, or a combination thereof.

Base station DU capabilities reception component 1295 may receive, from the second wireless device, a backpressure capabilities message indicating backpressure handling capabilities of the second wireless device. In some cases, the backpressure capabilities message is received on an L3 signaling connection, an RRC connection, an F1 AP interface, or a combination thereof.

Figure 13:
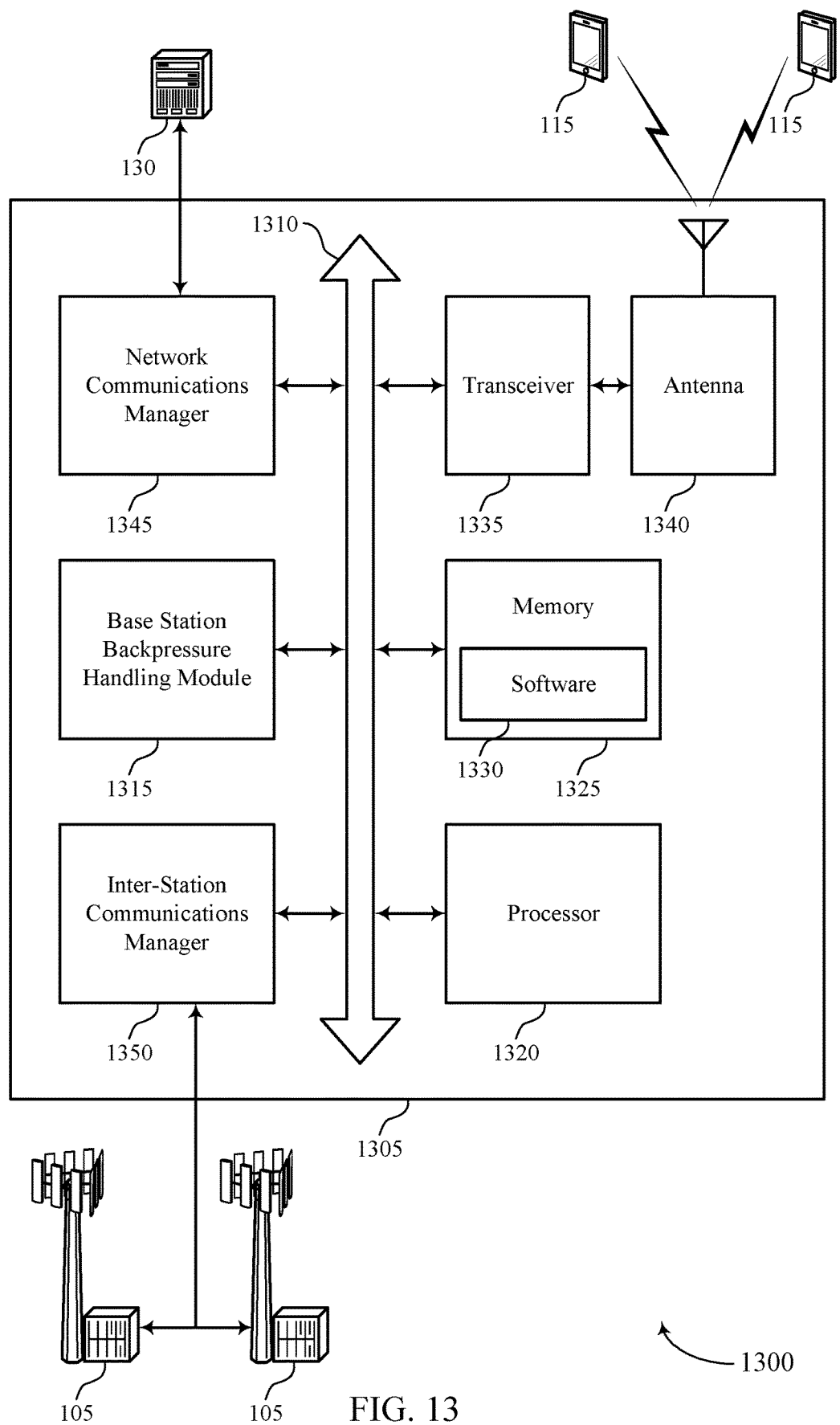
FIG. 13 shows a diagram of a system including a device (e.g., a base station) that supports backpressure signaling for wireless communications in accordance with aspects of the present disclosure.

FIG. 13 shows a diagram of a system 1300 including a device 1305 that supports backpressure signaling for wireless communications in accordance with aspects of the present disclosure. Device 1305 may be an example of or include the components of wireless device 1005, wireless device 1105, or a base station 105 as described above, e.g., with reference to FIGS. 1 through 5, 10, and 11. Device 1305 may include components for bi-directional voice and data communications including components for transmitting and receiving communications, including base station backpressure handling module 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Base station backpressure handling module 1315 may perform one or more of the functions described herein with reference to base station backpressure handling module 1015, base station backpressure handling module 1115, or base station backpressure handling module 1205 as described with reference to FIGS. 10 through 12.

Processor 1320 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting backpressure signaling for wireless communications).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support backpressure signaling for wireless communications. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network 130 (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
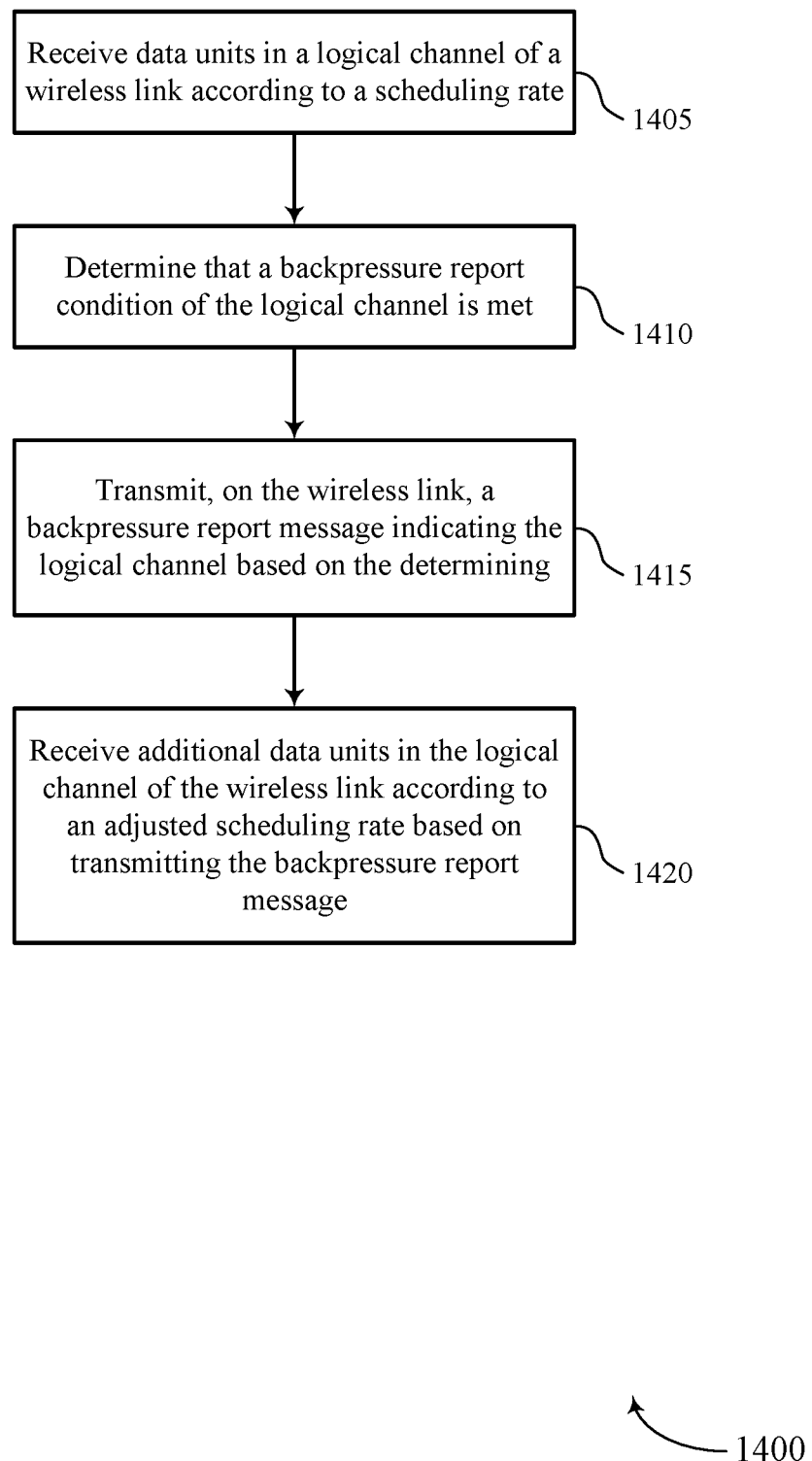
FIGS. 14 through 18 show flowcharts illustrating methods for backpressure signaling for wireless communications in accordance with aspects of the present disclosure.

FIG. 14 shows a flowchart illustrating a method 1400 for backpressure signaling for wireless communications in accordance with aspects of the present disclosure. The operations of method 1400 may be implemented by a UE 115 or base station 105 operating as an MT endpoint, or their components as described herein. For example, the operations of method 1400 may be performed by a UE backpressure handling module or base station backpressure handling module as described with reference to FIGS. 6 through 13. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1405 the UE 115 or base station 105 may receive data units in a logical channel of a wireless link according to a scheduling rate. The operations of 1405 may be performed according to the methods described herein. In certain examples, aspects of the operations of 1405 may be performed by a data unit reception component as described with reference to FIGS. 6 through 9.

At 1410 the UE 115 or base station 105 may determine that a backpressure report condition of the logical channel is met. The operations of 1410 may be performed according to the methods described herein. In certain examples, aspects of the operations of 1410 may be performed by a condition evaluation component as described with reference to FIGS. 6 through 9.

At 1415 the UE 115 or base station 105 may transmit, on the wireless link, a backpressure report message indicating the logical channel based at least in part on the determining. The operations of 1415 may be performed according to the methods described herein. In certain examples, aspects of the operations of 1415 may be performed by a backpressure reporting component as described with reference to FIGS. 6 through 9.

At 1420 the UE 115 or base station 105 may receive additional data units in the logical channel of the wireless link according to an adjusted scheduling rate based at least in part on transmitting the backpressure report message. The operations of 1420 may be performed according to the methods described herein. In certain examples, aspects of the operations of 1420 may be performed by a data unit reception component as described with reference to FIGS. 6 through 9.

Figure 15:
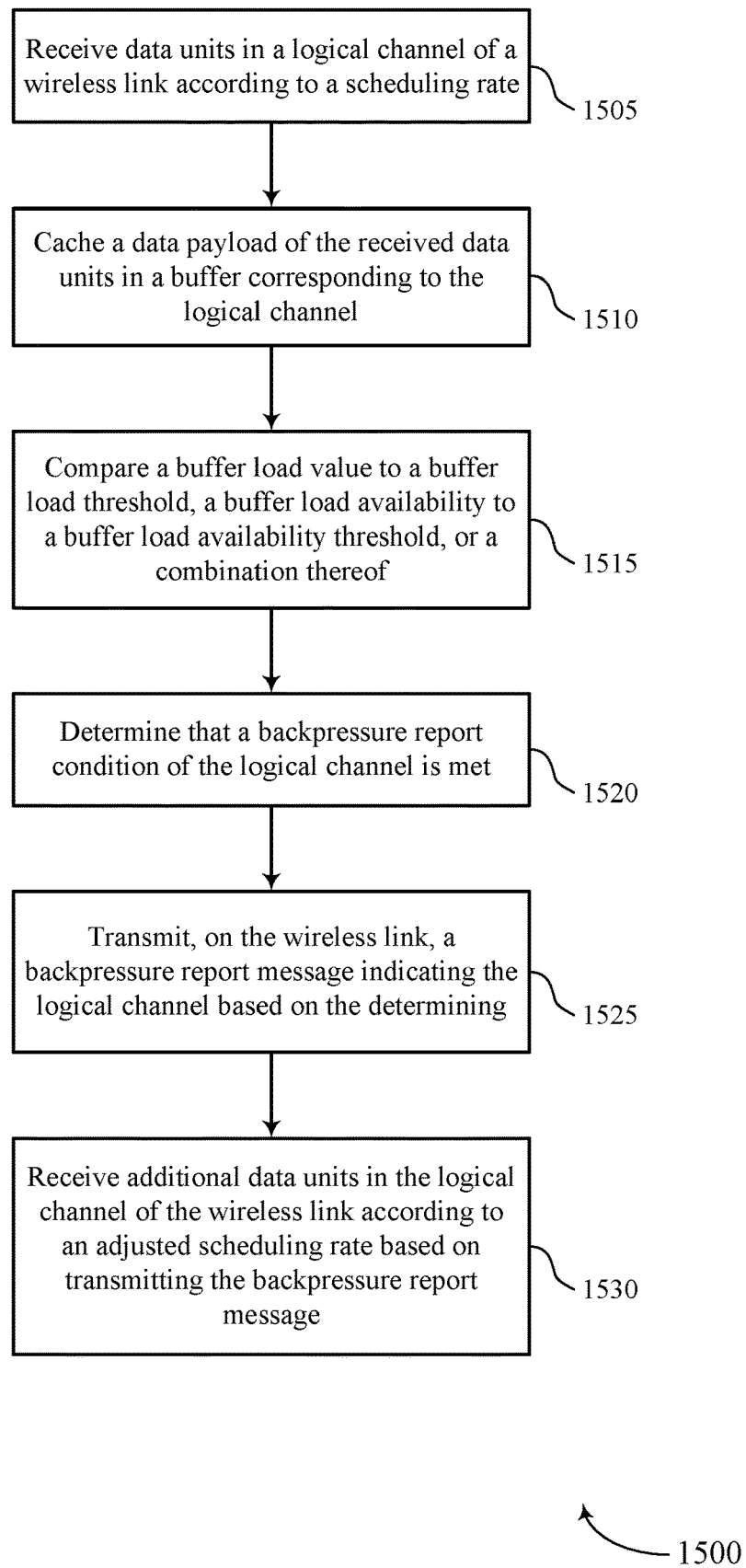

FIG. 15 shows a flowchart illustrating a method 1500 for backpressure signaling for wireless communications in accordance with aspects of the present disclosure. The operations of method 1500 may be implemented by a UE 115 or base station 105 operating as an MT endpoint, or their components as described herein. For example, the operations of method 1500 may be performed by a UE backpressure handling module or base station backpressure handling module as described with reference to FIGS. 6 through 13. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1505 the UE 115 or base station 105 may receive data units in a logical channel of a wireless link according to a scheduling rate. The operations of 1505 may be performed according to the methods described herein. In certain examples, aspects of the operations of 1505 may be performed by a data unit reception component as described with reference to FIGS. 6 through 9.

At 1510 the UE 115 or base station 105 may cache a data payload of the received data units in a buffer corresponding to the logical channel. The operations of 1510 may be performed according to the methods described herein. In certain examples, aspects of the operations of 1510 may be performed by a caching component as described with reference to FIGS. 6 through 9.

At 1515 the UE 115 or base station 105 may compare a buffer load value to a buffer load threshold, a buffer load availability to a buffer load availability threshold, or a combination thereof. The operations of 1515 may be performed according to the methods described herein. In certain examples, aspects of the operations of 1515 may be performed by a buffer load evaluation component as described with reference to FIGS. 6 through 9.

At 1520 the UE 115 or base station 105 may determine that a backpressure report condition of the logical channel is met based on the comparing. The operations of 1520 may be performed according to the methods described herein. In certain examples, aspects of the operations of 1520 may be performed by a condition evaluation component as described with reference to FIGS. 6 through 9.

At 1525 the UE 115 or base station 105 may transmit, on the wireless link, a backpressure report message indicating the logical channel based at least in part on the determining. The operations of 1525 may be performed according to the methods described herein. In certain examples, aspects of the operations of 1525 may be performed by a backpressure reporting component as described with reference to FIGS. 6 through 9.

At 1530 the UE 115 or base station 105 may receive additional data units in the logical channel of the wireless link according to an adjusted scheduling rate based at least in part on transmitting the backpressure report message. The operations of 1530 may be performed according to the methods described herein. In certain examples, aspects of the operations of 1530 may be performed by a data unit reception component as described with reference to FIGS. 6 through 9.

Figure 16:
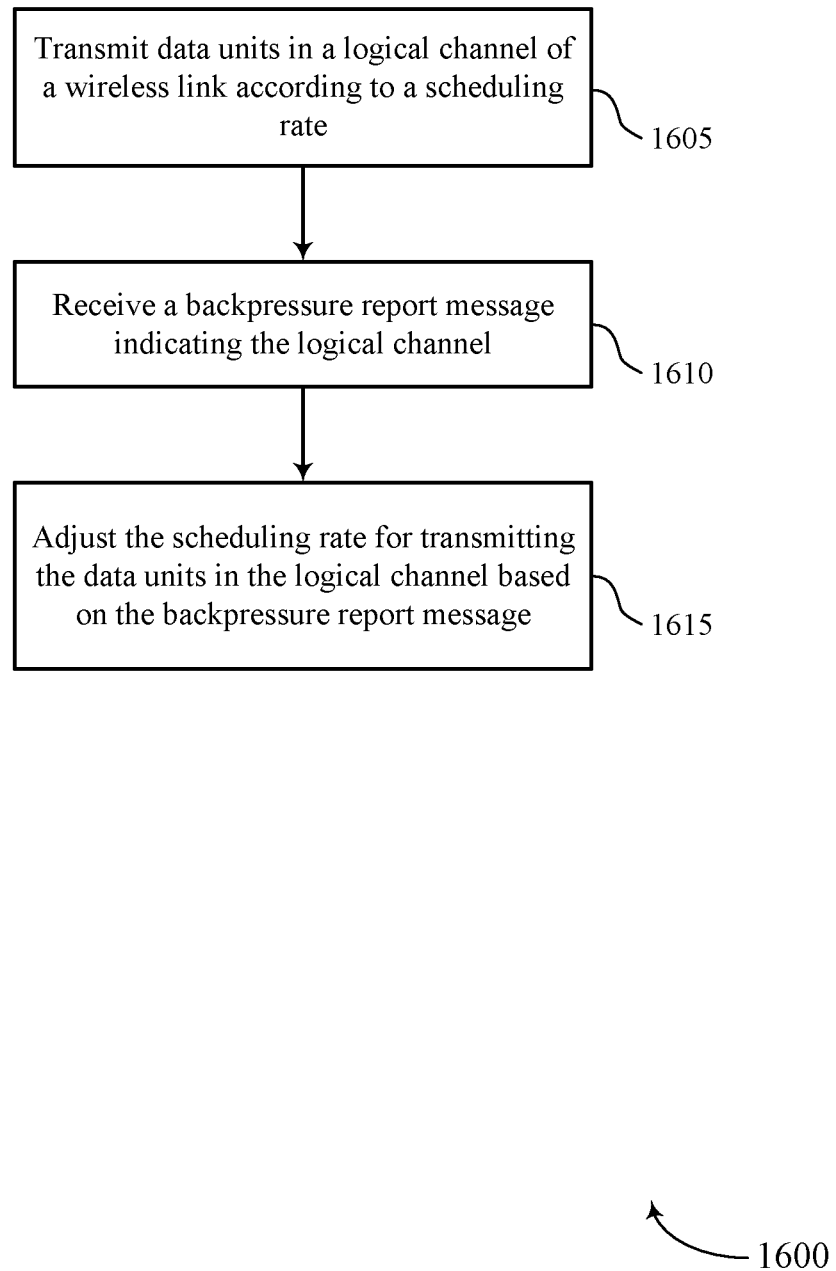

FIG. 16 shows a flowchart illustrating a method 1600 for backpressure signaling for wireless communications in accordance with aspects of the present disclosure. The operations of method 1600 may be implemented by a base station 105 operating as a base station DU endpoint, or its components as described herein. For example, the operations of method 1600 may be performed by a base station backpressure handling module as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit data units in a logical channel of a wireless link according to a scheduling rate. The operations of 1605 may be performed according to the methods described herein. In certain examples, aspects of the operations of 1605 may be performed by a data unit transmission component as described with reference to FIGS. 10 through 13.

At 1610 the base station 105 may receive a backpressure report message indicating the logical channel. The operations of 1610 may be performed according to the methods described herein. In certain examples, aspects of the operations of 1610 may be performed by a backpressure report reception component as described with reference to FIGS. 10 through 13.

At 1615 the base station 105 may adjust the scheduling rate for transmitting the data units in the logical channel based at least in part on the backpressure report message. The operations of 1615 may be performed according to the methods described herein. In certain examples, aspects of the operations of 1615 may be performed by a scheduling rate adjustment component as described with reference to FIGS. 10 through 13.

Figure 17:
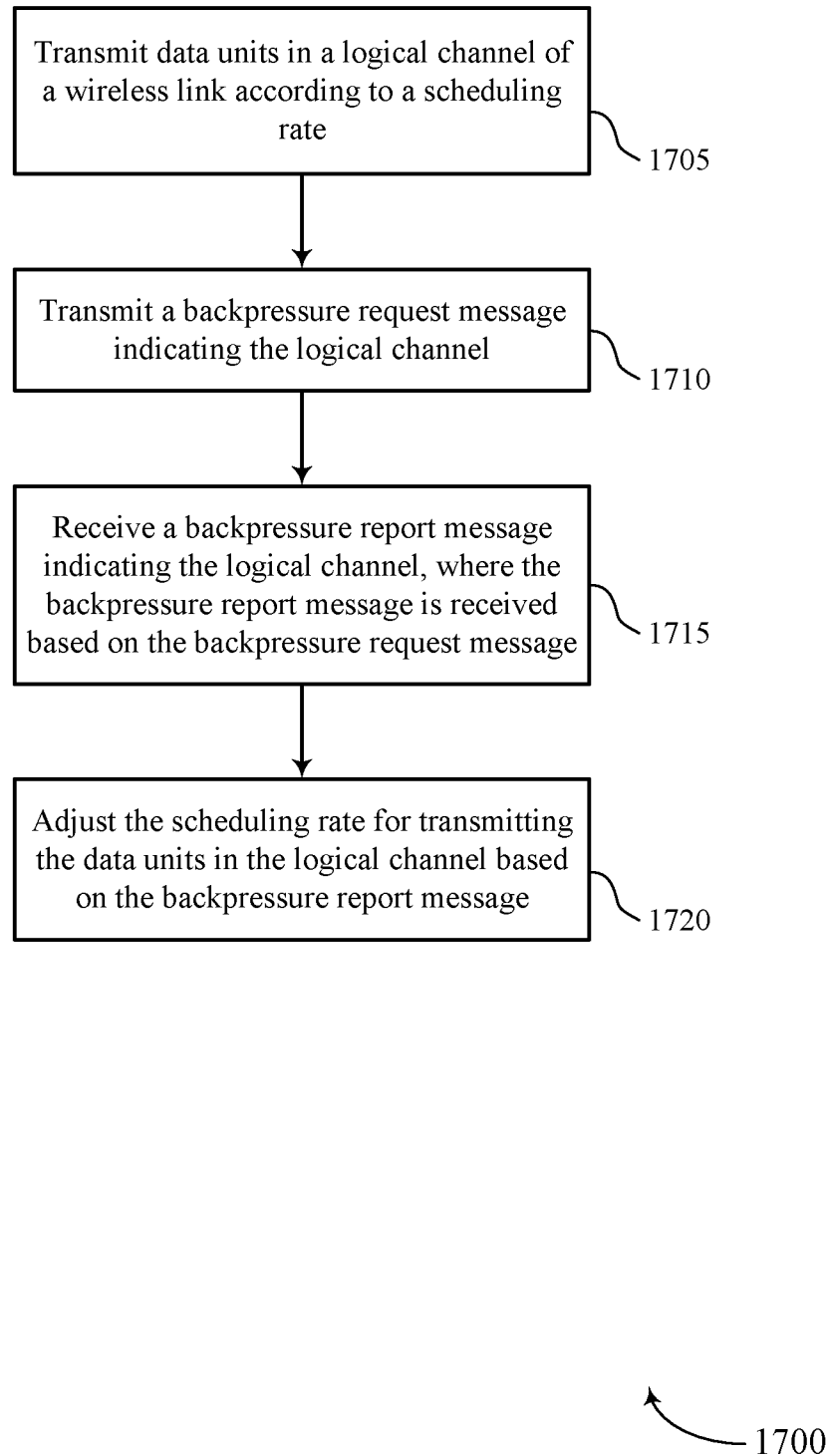

FIG. 17 shows a flowchart illustrating a method 1700 for backpressure signaling for wireless communications in accordance with aspects of the present disclosure. The operations of method 1700 may be implemented by a base station 105 operating as a base station DU endpoint, or its components as described herein. For example, the operations of method 1700 may be performed by a base station backpressure handling module as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit data units in a logical channel of a wireless link according to a scheduling rate. The operations of 1705 may be performed according to the methods described herein. In certain examples, aspects of the operations of 1705 may be performed by a data unit transmission component as described with reference to FIGS. 10 through 13.

At 1710 the base station 105 may transmit a backpressure request message indicating the logical channel. The operations of 1710 may be performed according to the methods described herein. In certain examples, aspects of the operations of 1710 may be performed by a backpressure request transmission component as described with reference to FIGS. 10 through 13.

At 1715 the base station 105 may receive a backpressure report message indicating the logical channel, where the backpressure report message is received based at least in part on the backpressure request message. The operations of 1715 may be performed according to the methods described herein. In certain examples, aspects of the operations of 1715 may be performed by a backpressure report reception component as described with reference to FIGS. 10 through 13.

At 1720 the base station 105 may adjust the scheduling rate for transmitting the data units in the logical channel based at least in part on the backpressure report message. The operations of 1720 may be performed according to the methods described herein. In certain examples, aspects of the operations of 1720 may be performed by a scheduling rate adjustment component as described with reference to FIGS. 10 through 13.

Figure 18:
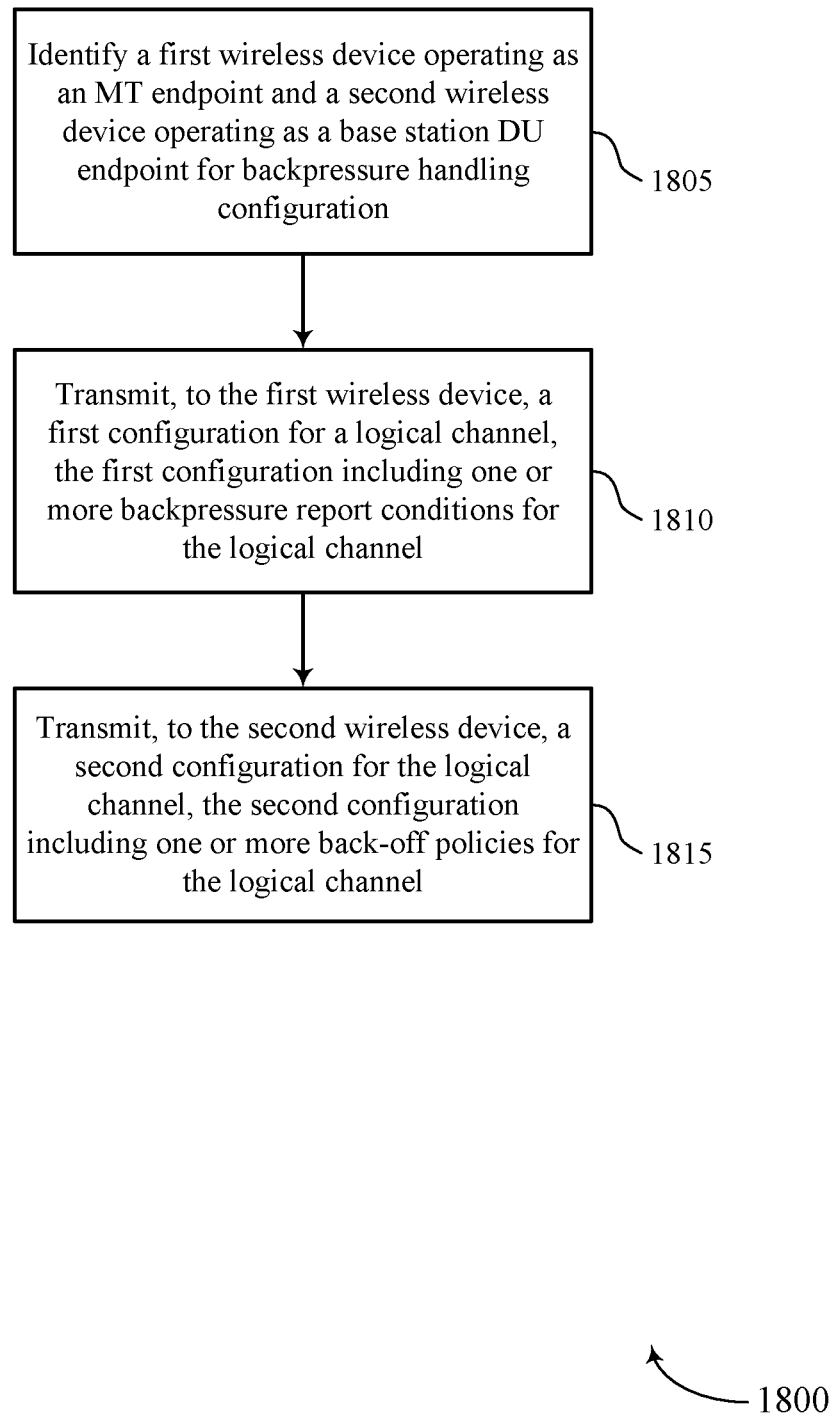

FIG. 18 shows a flowchart illustrating a method 1800 for backpressure signaling for wireless communications in accordance with aspects of the present disclosure. The operations of method 1800 may be implemented by a base station 105 operating as a base station CU, or its components as described herein. For example, the operations of method 1800 may be performed by a base station backpressure handling module as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may identify a first wireless device operating as an MT endpoint and a second wireless device operating as a base station DU endpoint for backpressure handling configuration. The operations of 1805 may be performed according to the methods described herein. In certain examples, aspects of the operations of 1805 may be performed by an identification component as described with reference to FIGS. 10 through 13.

At 1810 the base station 105 may transmit, to the first wireless device, a first configuration for a logical channel, the first configuration including one or more backpressure report conditions for the logical channel. The operations of 1810 may be performed according to the methods described herein. In certain examples, aspects of the operations of 1810 may be performed by an MT configuration component as described with reference to FIGS. 10 through 13.

At 1815 the base station 105 may transmit, to the second wireless device, a second configuration for the logical channel, the second configuration including one or more back-off policies for the logical channel. The operations of 1815 may be performed according to the methods described herein. In certain examples, aspects of the operations of 1815 may be performed by a base station DU configuration component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving data units in a Radio Link Control Lo (RLC-Lo) portion of a logical channel of a wireless link according to a scheduling rate;
   determining that a backpressure report condition of the logical channel is met;
   transmitting, on the wireless link, a backpressure report message indicating the logical channel based at least in part on the determining; and
   receiving additional data units in the (RLC-Lo) portion of a logical channel of the wireless link according to an adjusted scheduling rate based at least in part on transmitting the backpressure report message.

2. The method of claim 1, further comprising:
   caching a data payload of the received data units in a buffer corresponding to the logical channel, wherein determining that the backpressure report condition of the logical channel is met comprises:
   comparing a buffer load value to a buffer load threshold, a buffer load availability to a buffer load availability threshold, or a combination thereof.

3. The method of claim 1, wherein the adjusted scheduling rate comprises a decreased scheduling rate that is lower than the scheduling rate or an increased scheduling rate that is higher than the scheduling rate.

4. The method of claim 1, wherein receiving the additional data units in the (RLC-Lo) portion of the logical channel of the wireless link according to the adjusted scheduling rate comprises:
   receiving the additional data units after a temporary halting of data units transmissions.

5. The method of claim 1, wherein the logical channel corresponds to a logical channel identifier, the method further comprising:
   configuring the backpressure report message with the logical channel identifier, a logical channel group identifier corresponding to a logical channel group comprising the logical channel, or a combination thereof, wherein the backpressure report message indicates the logical channel based at least in part on the logical channel identifier, the logical channel group identifier, or the combination thereof.

6. The method of claim 1, wherein determining that the backpressure report condition of the logical channel is met comprises:
   receiving a backpressure request message indicating the logical channel, wherein transmitting the backpressure report message is based at least in part on a request-based condition.

7. The method of claim 1, further comprising:
   configuring the backpressure report message with buffer load information.

8. The method of claim 7, wherein the buffer load information comprises a backpressure indicator, a backpressure indicator value, a buffer load value, a buffer load availability indicator, or a combination thereof.

9. The method of claim 1, further comprising:
   receiving a configuration for the logical channel, wherein the configuration comprises one or more backpressure report conditions, wherein determining that the backpressure report condition of the logical channel is met is based at least in part on the configuration.

10. The method of claim 9, wherein the one or more backpressure report conditions comprise periodic reporting conditions, buffer load-based reporting conditions, request-based reporting conditions, or a combination thereof.

11. The method of claim 10, wherein the one or more backpressure report conditions further comprise indications of time intervals for periodic reporting, buffer load thresholds for buffer load-based reporting, buffer load availability thresholds for the buffer load-based reporting, averaging windows for the buffer load-based reporting, hysteresis values for the buffer load-based reporting, or a combination thereof.

12. The method of claim 9, wherein the configuration is received on a layer three (L3) signaling connection, a radio resource control (RRC) connection, an F1 application protocol (AP) interface, or a combination thereof.

13. The method of claim 1, further comprising:
    transmitting a backpressure capabilities message to a base station centralized unit (CU).

14. The method of claim 13, wherein the backpressure capabilities message comprises at least one buffer size value.

15. The method of claim 13, wherein the backpressure capabilities message is transmitted on a layer three (L3) signaling connection, a radio resource control (RRC) connection, an F1 application protocol (AP) interface, or a combination thereof.

16. The method of claim 1, wherein the backpressure report message comprises a medium access control (MAC) signaling message.

17. The method of claim 16, wherein transmitting the backpressure report message comprises:
    transmitting the MAC signaling message in a MAC channel element on a physical uplink shared channel (PUSCH), in an uplink channel indicator on a physical uplink control channel (PUCCH), or in a combination thereof.

18. The method of claim 1, wherein the data units comprise downlink medium access control (MAC) service data units (SDUs) and are received on a physical downlink shared channel (PDSCH).

19. The method of claim 1, wherein the logical channel comprises a radio link control (RLC) channel, an RLC-bearer, an RLC-bearer chain, or a combination thereof.

20. A method for wireless communications, comprising:
    transmitting data units in a Radio Link Control Lo (RLC-Lo) portion of a logical channel of a wireless link according to a scheduling rate;
    receiving a backpressure report message indicating the logical channel; and
    adjusting the scheduling rate for transmitting the data units in the (RLC-Lo) portion of the logical channel based at least in part on the backpressure report message.

21. The method of claim 20, further comprising:
    transmitting additional data units in the (RLC-Lo) portion of the logical channel of the wireless link according to the adjusted scheduling rate.

22. The method of claim 20, wherein adjusting the scheduling rate comprises decreasing the scheduling rate, increasing the scheduling rate, temporarily halting transmission of the data units, or a combination thereof.

23. The method of claim 20, wherein:
the logical channel corresponds to a logical channel identifier;
the backpressure report message comprises the logical channel identifier, a logical channel group identifier corresponding to a logical channel group comprising the logical channel, or a combination thereof; and
the backpressure report message indicates the logical channel using the logical channel identifier, the logical channel group identifier, or the combination thereof.

24. The method of claim 20, further comprising:
transmitting a backpressure request message indicating the logical channel, wherein the backpressure report message is received based at least in part on the backpressure request message.

25. The method of claim 24, further comprising:
receiving a configuration for the logical channel, wherein the configuration comprises one or more trigger conditions for transmitting the backpressure request message.

26. The method of claim 20, wherein:
the backpressure report message comprises buffer load information; and
the adjusting the scheduling rate is based at least in part on the buffer load information.

27. The method of claim 26, wherein the buffer load information comprises a backpressure indicator, a backpressure indicator value, a buffer load value, a buffer load availability indicator, or a combination thereof.

28. The method of claim 20, further comprising:
receiving a configuration for the logical channel, wherein the configuration comprises one or more back-off policies for the logical channel.

29. The method of claim 28, wherein the one or more back-off policies comprise indications of a step size, a ramping slope, or a combination thereof adjusting the scheduling rate.

30. The method of claim 28, wherein the one or more back-off policies comprise a backpressure condition, a backpressure threshold, a buffer load threshold, a buffer load availability threshold, or a combination thereof, wherein adjusting the scheduling rate is based at least in part on the backpressure condition, the backpressure threshold, the buffer load threshold, the buffer load availability threshold, or the combination thereof.

31. The method of claim 28, wherein the configuration is received on a layer three (L3) signaling connection, a radio resource control (RRC) connection, an F1 application protocol (AP) interface, or a combination thereof.

32. The method of claim 20, further comprising:
transmitting a backpressure capabilities message to a base station centralized unit (CU).

33. The method of claim 32, wherein the backpressure capabilities message is transmitted on a layer three (L3) signaling connection, a radio resource control (RRC) connection, an F1 application protocol (AP) interface, or a combination thereof.

34. The method of claim 20, wherein the backpressure report message comprises a medium access control (MAC) signaling message.

35. The method of claim 34, wherein receiving the backpressure report message comprises:

receiving the MAC signaling message in a MAC channel element on a physical uplink shared channel (PUSCH), in an uplink channel indicator on a physical uplink control channel (PUCCH), or in a combination thereof.

36. The method of claim 20, wherein the data units comprise downlink medium access control (MAC) protocol data units (PDUs).

37. The method of claim 20, wherein the logical channel comprises a radio link control (RLC) channel, an RLC-bearer, an RLC-bearer chain, or a combination thereof.

38. A method for wireless communications, comprising:
identifying a first wireless device operating as a mobile termination (MT) endpoint and a second wireless device operating as a base station distributed unit (DU) endpoint for backpressure handling configuration;
transmitting, to the first wireless device, a first configuration for a split Radio Link Control (RLC) logical channel, the first configuration comprising one or more backpressure report conditions for the split RLC logical channel; and
transmitting, to the second wireless device, a second configuration for the split RLC logical channel, the second configuration comprising one or more back-off policies for the split logical channel.

39. The method of claim 38, wherein the split logical channel corresponds to a split RLC logical channel identifier, the method further comprising:
configuring the first configuration with the logical channel identifier, a logical channel group identifier corresponding to a logical channel group comprising the logical channel, or a combination thereof; and
configuring the second configuration with the logical channel identifier, the logical channel group identifier, or the combination thereof.

40. The method of claim 38, wherein the one or more backpressure report conditions comprise periodic reporting conditions, buffer load-based reporting conditions, request-based reporting conditions, or a combination thereof.

41. The method of claim 40, wherein the one or more backpressure report conditions further comprise indications of time intervals for periodic reporting, buffer load thresholds for buffer load-based reporting, buffer load availability thresholds for the buffer load-based reporting, averaging windows for the buffer load-based reporting, hysteresis values for the buffer load-based reporting, or a combination thereof.

42. The method of claim 38, wherein the one or more back-off policies comprise indications of a step size, a ramping slope, or a combination thereof adjusting a data unit scheduling rate.

43. The method of claim 38, wherein the one or more back-off policies comprise a backpressure condition, a backpressure threshold, a buffer load threshold, a buffer load availability threshold, or a combination thereof.

44. The method of claim 38, wherein the second configuration for the split logical channel comprises one or more backpressure request conditions.

45. The method of claim 38, further comprising:
receiving, from the first wireless device, a backpressure capabilities message indicating backpressure handling capabilities of the first wireless device.

46. The method of claim 45, wherein the backpressure capabilities message is received on a layer three (L3) signaling connection, a radio resource control (RRC) connection, an F1 application protocol (AP) interface, or a combination thereof.

47. The method of claim 38, further comprising:
receiving, from the second wireless device, a backpressure capabilities message indicating backpressure handling capabilities of the second wireless device.

48. The method of claim 47, wherein the backpressure capabilities message is received on a layer three (L3) signaling connection, a radio resource control (RRC) connection, an F1 application protocol (AP) interface, or a combination thereof.

49. The method of claim 38, wherein the first configuration and the second configuration are transmitted on a layer three (L3) signaling connection, a radio resource control (RRC) connection, an F1 application protocol (AP) interface, or a combination thereof.

50. The method of claim 38, wherein the first wireless device comprises a user equipment (UE) or a relay base station.

51. The method of claim 38, wherein the second wireless device comprises a relay base station or a donor base station.

52. The method of claim 38, wherein the split logical channel comprises a radio link control (RLC) channel, an RLC-bearer, an RLC-bearer chain, or a combination thereof.

53. An apparatus for wireless communications, comprising:
means for receiving data units in a (RLC-Lo) portion of a logical channel of a wireless link according to a scheduling rate;
means for determining that a backpressure report condition of the logical channel is met;
means for transmitting, on the wireless link, a backpressure report message indicating the logical channel based at least in part on the determining; and
means for receiving additional data units in the (RLC-Lo) portion of the logical channel of the wireless link according to an adjusted scheduling rate based at least in part on transmitting the backpressure report message.

54. An apparatus for wireless communications, comprising:
means for transmitting data units in a (RLC-Lo) portion of a logical channel of a wireless link according to a scheduling rate;
means for receiving a backpressure report message indicating the logical channel; and
means for adjusting the scheduling rate for transmitting the data units in the (RLC-Lo) portion of the logical channel based at least in part on the backpressure report message.

55. An apparatus for wireless communications, comprising:
means for identifying a first wireless device operating as a mobile termination (MT) endpoint and a second wireless device operating as a base station distributed unit (DU) endpoint for backpressure handling configuration;
means for transmitting, to the first wireless device, a first configuration for a split logical channel, the first configuration comprising one or more backpressure report conditions for the split RLC logical channel; and
means for transmitting, to the second wireless device, a second configuration for the split logical channel, the second configuration comprising one or more back-off policies for the split logical channel.

56. An apparatus for wireless communications, comprising:
a processor;
memory in electronic communication with the processor; and
instructions stored in the memory and executable by the processor to cause the apparatus to:
receive data units in a (RLC-Lo) portion of a logical channel of a wireless link according to a scheduling rate;
determine that a backpressure report condition of the logical channel is met;
transmit, on the wireless link, a backpressure report message indicating the logical channel based at least in part on the determining; and
receive additional data units in the (RLC-Lo) portion of the logical channel of the wireless link according to an adjusted scheduling rate based at least in part on transmitting the backpressure report message.

57. An apparatus for wireless communications, comprising:
a processor;
memory in electronic communication with the processor; and
instructions stored in the memory and executable by the processor to cause the apparatus to:
transmit data units in a (RLC-Lo) portion of a logical channel of a wireless link according to a scheduling rate;
receive a backpressure report message indicating the logical channel; and
adjust the scheduling rate for transmitting the data units in the (RLC-Lo) portion of the logical channel based at least in part on the backpressure report message.

58. An apparatus for wireless communications, comprising:
a processor;
memory in electronic communication with the processor; and
instructions stored in the memory and executable by the processor to cause the apparatus to:
identify a first wireless device operating as a mobile termination (MT) endpoint and a second wireless device operating as a base station distributed unit (DU) endpoint for backpressure handling configuration;
transmit, to the first wireless device, a first configuration for a split RLC logical channel, the first configuration comprising one or more backpressure report conditions for the split logical channel; and
transmit, to the second wireless device, a second configuration for the split RLC logical channel, the second configuration comprising one or more back-off policies for the split logical channel.

59. A non-transitory computer-readable medium storing code for wireless communications, the code comprising instructions executable by a processor to:
receive data units in a (RLC-Lo) portion of a logical channel of a wireless link according to a scheduling rate;
determine that a backpressure report condition of the logical channel is met;
transmit, on the wireless link, a backpressure report message indicating the logical channel based at least in part on the determining; and
receive additional data units in the (RLC-Lo) portion of a logical channel of the wireless link according to an adjusted scheduling rate based at least in part on transmitting the backpressure report message.

60. A non-transitory computer-readable medium storing code for wireless communications, the code comprising instructions executable by a processor to: transmit data units in a split RLC logical channel of a wireless link according to a scheduling rate;

receive a backpressure report message indicating the split RLC logical channel; and adjust the scheduling rate for transmitting the data units in the split RLC logical channel based at least in part on the backpressure report message.

61. A non-transitory computer-readable medium storing code for wireless communications, the code comprising instructions executable by a processor to:

identify a first wireless device operating as a mobile termination (MT) endpoint and a second wireless device operating as a base station distributed unit (DU) endpoint for backpressure handling configuration;

transmit, to the first wireless device, a first configuration for a split RLC logical channel, the first configuration comprising one or more backpressure report conditions for the split logical channel; and transmit, to the second wireless device, a second configuration for the split RLC logical channel, the second configuration comprising one or more back-off policies for the split RLC logical channel.

\* \* \* \* \*